United States Patent
Davidson et al.

(10) Patent No.: US 12,347,447 B2
(45) Date of Patent: Jul. 1, 2025

(54) PSYCHOACOUSTIC MODEL FOR AUDIO PROCESSING

(71) Applicant: DOLBY LABORATORIES LICENSING CORPORATION, San Francisco, CA (US)

(72) Inventors: Grant A. Davidson, Burlingame, CA (US); Louis D. Fielder, Millbrae, CA (US); Mark S. Vinton, Alameda, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 279 days.

(21) Appl. No.: 17/779,258

(22) PCT Filed: Dec. 3, 2020

(86) PCT No.: PCT/US2020/062962
§ 371 (c)(1),
(2) Date: May 24, 2022

(87) PCT Pub. No.: WO2021/113416
PCT Pub. Date: Jun. 10, 2021

(65) Prior Publication Data
US 2022/0415334 A1    Dec. 29, 2022

Related U.S. Application Data

(60) Provisional application No. 62/943,903, filed on Dec. 5, 2019.

(30) Foreign Application Priority Data

Dec. 5, 2019   (EP) ..................... 19213742

(51) Int. Cl.
*G10L 19/032*   (2013.01)
*G01L 19/04*    (2006.01)

(52) U.S. Cl.
CPC ............ *G10L 19/032* (2013.01); *G01L 19/04* (2013.01)

(58) Field of Classification Search
CPC ............................ G10L 19/032; G10L 19/04
See application file for complete search history.

(56) References Cited

U.S. PATENT DOCUMENTS

| 5,625,743 A | 4/1997 | Fiocca |
| 5,649,053 A | 7/1997 | Kim |
| 6,128,593 A * | 10/2000 | Hu .......................... G10L 19/02 704/229 |
| 6,308,150 B1 * | 10/2001 | Neo ....................... G10L 19/002 704/229 |

(Continued)

FOREIGN PATENT DOCUMENTS

| EP | 0812070 B1 | 10/2003 |
| EP | 2631906 A1 | 8/2013 |

(Continued)

OTHER PUBLICATIONS

Koch, Anthony C. "Design of two psychoacoustic models for real time implementation of a wideband audio codec." Oct. 1993, PhD diss., University of British Columbia, pp. i-viii and 1-83. (Year: 1993).*

(Continued)

*Primary Examiner* — Daniel R Sellers

(57) ABSTRACT

The present disclosure relates to the field of audio coding, in particular, it relates to a method for encoding audio signals through a masking model based on a hearing threshold of frequency intervals of the audio signal and a measured energy of the audio signal for the corresponding frequency intervals. The disclosure further relates to an encoder that is capable of carrying out the audio encoding method.

20 Claims, 9 Drawing Sheets

(56) References Cited

U.S. PATENT DOCUMENTS

| | | | |
|---|---|---|---|
| 6,794,567 B2 | 9/2004 | Hughes | |
| 7,523,039 B2 | 4/2009 | Manu | |
| 7,634,400 B2 | 12/2009 | Averty | |
| 8,391,212 B2 | 3/2013 | Gao | |
| 9,076,438 B2 | 7/2015 | Tsai | |
| 9,300,714 B2 | 3/2016 | Bauer | |
| 9,514,767 B2 | 12/2016 | Nagel | |
| 9,672,806 B2 | 6/2017 | Uhle | |
| 9,704,497 B2 | 7/2017 | Porter | |
| 2002/0004718 A1 | 1/2002 | Hasegawa | |
| 2007/0129939 A1* | 6/2007 | Ghanekar | G10L 19/002 704/E19.022 |
| 2008/0219466 A1 | 9/2008 | Pishehvar | |
| 2009/0089049 A1 | 4/2009 | Moon | |
| 2009/0204397 A1 | 8/2009 | Den Drinker | |
| 2017/0032800 A1 | 2/2017 | Oh | |
| 2017/0110134 A1 | 4/2017 | Disch | |
| 2020/0395035 A1* | 12/2020 | Kolter | G10L 15/10 |

FOREIGN PATENT DOCUMENTS

| | | | |
|---|---|---|---|
| JP | 2000004163 A | 1/2000 | |
| KR | 20170125058 A | 11/2017 | |
| WO | 2017080835 A1 | 5/2017 | |
| WO | 2018069900 A1 | 4/2018 | |

OTHER PUBLICATIONS

Andersen, R. et al "Introduction to Dolby Digital Plus, an Enhancement to the Dolby Digital Coding System" AES presented at the 117th Convention, Oct. 28-31, 2004, San Francisco, CA, USA, pp. 1-29.

Branstetter, B. et al Frequency and Level Dependent Masking of the Multiple Auditory Steady-State Response in the Bottlenose Dolphin (*Tursiops truncatus*) J. Acous Soc. Am, May 2008.

Davidson, G.A. et al "Parametric Bit Allocation in Perceptual Audio Coder," Presented at the 97th Convention of the Audio Engineering Society, Preprint 3921, (Nov. 1994.).

Fielder, L.D. "Evaluation of the Audible Distortion and Noise Produced by Digital Audio Converters," J. Audio Eng. Soc., vol. 35, pp. 517-535 (Jul./Aug. 1987).

Herre, J. et al "Psychoacoustic Models for Perceptual Audio Coding—A Tutorial Review" Applied Sciences, vol. 9, No. 14, Jul. 17, 2019, pp. 2854.

ISO/IEC 11172-3:1993(E), Information technology—Coding of moving pictures and associated audio for digital storage media at up to about 1.5 Mbit/s—Part 3: Audio.

Jan H Plasberg et al: The Sensitivity Matrix: Using Advanced Auditory Models in Speech and Audio Processing11 , IEEE Transactions on Audio, Speech and Language Processing, IEEE, US, vol. 15, No. 1, Jan. 1, 2007, pp. 310-319.

Painter, T. et al "Perceptual Coding of Digital Audio" IEEE, vol. 88, Issue 4, Apr. 2000.

Plasberg Jan H et al: The sensitivity matrix for a spectra-temporal auditory model, 2004 12th European Signal Processing Conference, IEEE, Sep. 6, 2004 (Sep. 6, 2004), pp. 1673-1676.

Schuijers E et al: Advances in Parametric Coding for High-Quality Audio, Preprints of Papers Presented at the AES Convention, XX, XX, Mar. 22, 2003 (Mar. 22, 2003), pp. 1-11.

C.J Moore in "An Introduction to the Psychology of Hearing", fifth edition, p. 403, Academic Press (2003).

* cited by examiner

PSYCHOACOUSTIC MODEL FOR AUDIO PROCESSING

CROSS-REFERENCE TO RELATED APPLICATIONS

This application claims priority of U.S. Provisional Patent Application No. 62/943,903, filed Dec. 5, 2019, and EP Patent Application No. 19213742.0, filed Dec. 5, 2019, both of which are hereby incorporated by reference in their entireties.

TECHNICAL FIELD

The present disclosure relates to the field of audio processing, in particular, it relates to a method for processing audio signals using a masking model that is based on a hearing threshold in quiet of frequency intervals of the audio signal and a measured energy value of the audio signal for the corresponding frequency intervals. The disclosure further relates to a device that is capable of carrying out the audio processing method.

BACKGROUND

The human brain cannot register all audio signals at all different frequencies. Therefore, when coding audio, it is beneficial to remove signals which are at frequencies and levels that are not perceptible to the human hearing system. This is typically done through removing irrelevant components from an audio signal. Within the context of perceptual audio coders, there are two principal methods by which encoders increase compression efficiency. These are removing signal redundancy and irrelevancy. Redundant (predictable) signal components are typically removed in the encoder and restored in the decoder. Irrelevant signal components are typically removed in an audio encoder by quantization and are not restored by the audio decoder.

Typically, encoders use psychoacoustic models, sometimes also referred to as perceptual models, to estimate a masking threshold for an audio spectrum. The masking threshold provides an estimate of the just-noticeable distortion, JND, allowed in each of multiple frequency bands of the audio spectrum. In accordance with critical bands of the human hearing system, the frequency bands are typically nonuniform in width. In a typical encoder, the masking threshold is input to a rate control loop which selects a scale factor (and quantization noise level) for each one of multiple scale factor bands. The performance of the typical encoder depends on how close the masking threshold estimate is to the true JND noise level, with masking threshold estimates exceeding the JND noise level resulting in fewer bits being allocated than necessary to avoid audible distortion, and masking threshold estimates below the JND noise level resulting in more bits being allocated than necessary, potentially at the expense of neighboring frequency bands.

Typically, the encoder determines the masking threshold by
1) computing signal energy of the audio signal on a critical-band frequency scale.
2) estimating a frequency response of the signal after processing by the basilar membrane (also known as the excitation function) by convolving the critical-band energies with a set of spreading functions.
3) In each critical band, adjusting the excitation function downward in that band by an amount estimated to achieve the JND noise level.

Moreover, models for determining a masking threshold often comprise hueristic rules that were developed by experimentation, but are not based directly on known properties of human hearing.

Therefore, there is room for improvement within the technical field of computing masking thresholds based on known properties of human hearing to improve bit allocation for frequency bands of an audio signal.

SUMMARY

In view of the above, it is thus an object of the present disclosure to overcome or mitigate at least some of the problems discussed above. In particular, it is an object of the present disclosure to provide a masking model based on the energy value of an audio signal in a frequency band and the hearing threshold in quiet for that frequency band. Moreover, it is an object of the present disclosure to provide a masking model that reduces the complexity of audio coding and improves the quality of encoded audio according to the above. Further and/or alternative objects of the present disclosure will be clear for the reader of this disclosure.

According to a first aspect, there is provided a method processing an audio signal, the audio signal comprising audio data in a plurality of frequency bands, the method comprising
for each frequency band of the plurality of frequency bands:
  determining an energy value for the audio data of the frequency band;
  determining a hearing threshold in quiet for the frequency band;
  calculating a sensitivity value, SV, for the frequency band using the energy value and the hearing threshold in quiet;
  computing a masking threshold for the frequency band using the sensitivity value and the energy value;
  determining a bit allocation value of the frequency band using the energy value and the masking threshold value.

By the term "energy value" should, in the context of the present specification, be understood that different approaches may be used for calculating the energies, for example, based on a banded modified discrete cosine transform (MDCT), a discrete Fourier transform (DFT), or a complex MDCT (CMDCT). It should be noted that several energy values may be calculated for a frequency band, and then combined in a suitable way to form a single energy value for the frequency band. In the present specification, "energy value" can refer to energy expressed either on a linear or dB scale.

By the term "frequency band" should, in the context of the present specification, be understood that a frequency band is an interval within a frequency domain, delimited by a lower and an upper frequency, having a frequency range. It should be noted that the plurality of frequency bands of the audio signal to be encoded do not necessarily need to have the same width/range. For example, a relatively lower frequency band may have a width of 100-200 Hz while a relatively higher frequency band may have a width of 3000-3500 Hz. Typically, the widths of frequency bands increase as frequency increases, such that frequency bands between the relatively lower frequency band and the relatively higher frequency band may typically have widths ranging anywhere from 100-3000 Hz.

By the term "sensitivity value" (SV) should, in the context of the present specification, be understood as an approximation of the adjustment required in a given critical band to achieve JND distortion for a human listener with normal hearing. To account for the effects of masking across critical bands, the SV for each band may depend not only on signal characteristics within that band, but also on the signals in neighboring bands. The SV for each band is typically applied as an offset or adjustment to the excitation function followed by application of the threshold in quiet to derive a final masking threshold. Any noise that lies below the masking threshold is inaudible.

The SV for a specific frequency band can, for example, be calculated using a ratio between the energy value of that frequency band and the hearing threshold in quiet for that frequency band, or a difference, or any other metric comparing the energy value and the hearing threshold in quiet.

In typical prior art encoders, the adjustment made to the excitation function downward in critical frequency bands is typically invariant with signal level, except for the application of a threshold in quiet at the end. As a result, typically, the estimated masking threshold may not fully correlate with the masking behavior of the human hearing system.

Thus, expressions of the adjustment for JND are typically level-independent. Such models are typically based on masking data for relatively loud or relatively quiet signals. This approach can limit codec performance, for example by underestimating the true JND threshold for low-level signal components, yielding an over allocation of bits to frames containing relatively quiet signal passages. This issue arises for encoders running in constant bit-rate mode with a bit-reservoir, as well as variable bit-rate encoders. Audio content characterized by very dynamic level changes, for example speech, will be adversely affected.

In the present disclosure, by calculating the masking threshold based on both the SV and the energy value, the masking threshold may more accurately capture observed masking behaviour of the human hearing system, thereby delivering higher quality of audio signals.

Moreover, when encoding the audio signal using a model that more faithfully captures observed masking behaviour of the human hearing system, the method may more accurately estimate the number of bits necessary to meet a predefined quality target providing a constant quality audio signal, and thereby over or under allocate bits less often. In embodiments where a constant bitrate is desired, the method may provide improved quality audio signals due to an improved bit allocation strategy.

The method may further provide a better match to subjectively measured masking data. Using the described audio encoding model, a single model appropriate for all recording sound levels or audio content may be achieved. Advantageously the model may facilitate encoding of audio signals in constant quality independent of properties of the audio signal to be encoded. Some examples of audio signal properties are pitch, loudness, or duration, though it is to be noted that there are many other properties of audio signals.

General Description of Embodiments

According to some embodiments, computing the masking threshold comprises applying a spreading function to one of: the energy values for the frequency bands; or transformed energy values of the frequency bands; to determine an excitation value for the frequency band, and combining the sensitivity value with the excitation value.

An excitation function can be thought of as an energy distribution along the basilar membrane of the inner ear. An excitation value is thus a value calculated from that function for a specific frequency band.

To emulate sound processing in the ear's basilar membrane, and to smooth the predictability measures across frequency, a spreading function is applied to the energy values or transformed versions of the energy values. For example, the spreading function may be applied to the energy values transformed to the loudness domain (i.e. raising the energy values to a power of ~0.25-0.3). In other embodiments, the spreading function may be applied to the energy values raised to a power of 0.5-0.6. The spreading function from ISO/IEC 11172-3:1993(E) may be used.

In case the sensitivity value and the excitation value are defined in decibels, dB, the step of combining may comprise computing the masking threshold by subtracting the sensitivity value from the excitation value. On the intensity scale, the masking threshold is calculated as the quotient of the excitation value and the sensitivity value.

Optionally, the masking threshold is derived by thresholding with the threshold in quiet, e.g. masking threshold=max(masking threshold, hearing threshold in quiet).

According to some embodiments, computing the masking threshold comprises combining the energy value and the sensitivity value to determine an intermediate threshold value, and applying a spreading function to the intermediate threshold value to determine the masking threshold.

For example, the masking threshold may be determined as max(intermediate threshold, hearing threshold in quiet).

According to some embodiments, the method further comprises quantizing audio samples of the audio data of the frequency band in response to the bit allocation value. Advantageously, an encoder may encode audio in constant quality or at a constant bitrate with an improved audio quality. The encoder may further encode the quantized audio data of the frequency band into a bitstream.

The method described herein may be used also at a decoder side. According to some embodiments, the audio signal is an encoded bitstream comprising an encoded energy value for the frequency band, wherein determining the energy value for the audio data of the frequency band comprises decoding the encoded energy value from the encoded bitstream. At a decoder side, the determined bit allocation value may be used for extracting quantized audio samples of the audio data of the frequency band from the encoded bitstream. Advantageously, the bit allocation value for each frequency band of each audio frame does not need to be included in the bitstream but can instead be determined at the decoder side. The bit rate of the encoded bitstream may thus be reduced.

According to some embodiments, the method further comprises dequantizing the quantized audio samples of the audio data of the frequency band and combining the dequantized audio samples of the audio data of each frequency band to generate a decoded audio signal.

According to some embodiments, determining the bit allocation value comprises adjusting the masking threshold to achieve a bit allocation that satisfies a target bitrate for the audio signal. In this embodiment, if a number of bits required by the nominal masking threshold may by greater (or less) than the number of bits available to satisfy the bit rate requirement, the masking threshold can be adjusted to allocate more or fewer bits in order to use as many bits as possible without exceeding the target bit rate. For example, adjusting the masking threshold may comprise: adjusting the masking threshold by adding a constant offset to the masking threshold in the loudness domain until the target bitrate for the audio signal is satisfied.

When determining and defining the energy and hearing threshold, different measurements can be used. According to some embodiments the energy value, hearing threshold in quiet and masking threshold are defined in decibels, dB. which provides simplicity to the model as the decibel is a common measurement for sound volume/energy.

According to some embodiments, the method comprises a step of determining the plurality of frequency bands of the audio signal in accordance with the Equivalent Rectangular Bandwidth, ERB, scale. The ERB scale provides an approximation to the bandwidths of the human hearing system using a convenient simplification of modelling hearing filters as rectangular band-pass filters. Advantageously, using ERB may be beneficial when encoding an audio signal in accordance to the human hearing system.

According to some embodiments, wherein the SV is defined in dB as a subtractive adjustment to the excitation function, the step of determining a bit allocation value comprises assigning more bits for a frequency band having a higher SV compared to said frequency band having a lower SV. Advantageously, a constant audio quality of an encoded audio signal may be achieved. The SV controls displacement of the excitation function which, after application of the threshold in quiet, yields the masking threshold. Positive sensitivity values push the masking threshold down. Negative sensitivity values boost the masking threshold. Consequently, increasing sensitivity value corresponds to lower masking thresholds and therefore more allocated bits. The sensitivity value for a frequency band may thus be seen as corresponding to the human hearing system's sensitivity to noise (coding artefacts) in the frequency band of the audio signal.

According to some embodiments, the step of calculating an SV for the frequency band comprises calculating a first SV using a sensation level, the sensation level being a difference, in the dB scale, between the energy value and the hearing threshold in quiet.

By the term "difference" should, in the context of the present specification be understood as subtracting the hearing threshold in quiet (expressed in dB) from the energy value (expressed in dB).

The term sensation level used herein is defined as the level of a sound relative to the threshold in quiet for that sound for an average listener. The term was introduced by C. J Moore in "An Introduction to the Psychology of Hearing", fifth edition, p. 403, Academic Press (2003).

It is to be noted that determining an accurate SV can be accomplished in different ways.

According to some embodiments, the step of calculating a first SV comprises multiplying the sensation level with a first scalar. Advantageously, a higher accuracy of SV may be achieved with reference to the human hearing system in a low complexity way. By multiplying a first scalar to the function, the difference and the SV can easily be mapped to each other to better correspond to the human hearing system.

The first scalar may be frequency dependent or constant over all frequency bands.

According to some embodiments, the step of calculating a first SV comprises adding a second scalar to the sensation level multiplied with the first scalar. The second scalar may be frequency dependent or constant over all frequency bands.

Advantageously, a higher accuracy of SV may be achieved with reference to the human hearing system in a low complexity way. By adding a second scalar to the function, the mapping between the difference and the SV can easily be changed to better correspond to the human hearing system.

According to some embodiments, the step of calculating an SV comprises using the first SV as the SV for the frequency band.

According to some embodiments, the step of calculating an SV for the frequency band comprises calculating a second SV using the sensation level and weighting the first and second SV based on at least one characteristic of the audio signal.

By way of example, such characteristics of the audio signal may be bandwidth, tone vs noise, nominal level, or power level in decibels, dB. However, it is to be noted that an audio signal has many characteristics that may be used in the method. By weighting the first and second SV, a masking threshold close to the JND may be obtained. Advantageously, constant audio quality may be achieved independent of the audio content of the audio signal.

In this embodiment, a noisy and loud audio signal may, when using the above model where two SVs are calculated and weighted, yield an encoded high-quality audio signal. A not so noisy and soft audio signal may also, when using the same model, yield the same level of quality for the encoded audio signal. Conversely, in a prior art dual-mode encoder, for audio signals which cannot be reliably classified such as dialog mixed with applause, the encoder must choose between e.g. an applause or default mode, and the mode chosen by the encoder may not be optimal. Alternatively, the encoder may choose to code different segments of the signal with different modes, which may lead to audible switching artefacts which reduce the quality of the encoded signal. With a single mode model, where a first and second SV are calculated and weighted, there is no need to determine which parts of the audio signal to code with the different modes. Moreover, the single mode model is appropriate for a variety of audio signals independent of the audio content (speech, music, etc.) of said audio signals. By providing a single model, there is no need for classification of audio samples to determine which mode needs to be applied for encoding. Moreover, the problem of choosing a mode for a signal which is bordering between modes is mitigated, and reductions in audio quality due to an encoder making a less optimal mode choice are avoided.

It should be noted that in some embodiments, further SVs can be defined and included when calculating the final SV (by weighting the >2 SVs). These different SVs may be weighted based on the transient characteristics of the audio signal.

According to some embodiments, the step of calculating a second SV for the frequency band comprises multiplying the sensation level with a third scalar different from the first scalar. The third scalar may be frequency dependent or constant over all frequency bands.

By multiplying the function with a third scalar the accuracy of SV with reference to the hearing system may be improved for audio signals with different characteristics, for example audio signals with a high degree of noise-like vs. tone-like characteristics. The third scalar may allow the SV to be mapped to enable a generalized model for audio coding. The SV is as understood from the above, and further described below, defined as a function of the sensation level. By mapping the SV according to the different characteristics of the audio signal, the relationship between hearing threshold and energy value may remain while the slope of SV vs sensation level may change according to different characteristics of the audio signal. Advantageously, bits can be allocated to provide an encoded audio signal with high quality.

According to some embodiments, the step of calculating a second SV comprises adding a fourth scalar to the sensation level multiplied with the third scalar, the fourth scalar being different from the second scalar. It is to be noted that the fourth scalar may be assigned different values, with the aim of improving the accuracy of the SV with reference to the human hearing system. The fourth scalar may be frequency dependent or constant over all frequency bands.

According to some embodiments, the step of weighting the first and second SV based on at least one characteristic of the audio signal comprises calculating a value representing the weight, the value ranging between 0-1, wherein the step of calculating the SV for the frequency band comprises multiplying one of the first and the second SV with the value and multiplying the other one of the first or the second SV with one minus the value, and adding the two resulting sums together to form the SV for the frequency band.

In other words, the first and second SV are mixed as a linear combination with weights that sum to unity, wherein the weights depends on said at least one characteristic of the audio signal.

By calculating the overall SV by weighting the first and the second SV, the mapping between sensation level and SV can be adapted to reflect masking characteristics of different audio signal types. Advantageously, a low complexity and flexible model for determining a bit allocation value of the frequency band may be achieved that provides high quality encoded audio signals.

According to some embodiments, the at least one characteristic defines an estimated tonality of the frequency band of the audio signal.

It is to be noted that there are many different ways to estimate tonality of an audio signal. Tonality represents the relationships between tonal characteristics in an audio signal (for example notes, chords, keys, pitches etc.). Advantageously, using the estimated tonality of the frequency band of the audio signal as the characteristic for weighting the first and second SV may improve the accuracy of the SV with reference to the human hearing system. Moreover, by using tonality, the subjective audio quality may be improved.

According to some embodiments, the at least one characteristic defines an estimated level of noise in the frequency band of the audio signal. Advantageously, the noise of the audio signal may be masked with reference to the human hearing system in order to achieve a high quality encoded audio signal.

According to some embodiments, the estimated tonality is calculated using adaptive prediction of frequency coefficients calculated from the frequency band of the audio signal. In some embodiments, the same set of frequency coefficients are used both for calculating the masking threshold and estimating the tonality. In other embodiments, the estimation of tonality is performed using a separate, complex-valued filterbank. It is to be noted that any set of frequency coefficients is possible, depending on the accuracy of the estimated tonality that is desired, and the computational resources available. For example, using real MDCT coefficients only would be computationally less expensive than using CMDCT coefficients, but less accurate. By obtaining an accurate estimated tonality, the subjective audio quality may further be improved.

According to some embodiments, linear predictive coding, LPC is adaptively applied to MDCT coefficients based on a frequency band of the audio signal from which the MDCT coefficients are calculated. LPC may be used as opposed to fixed prediction in order to achieve more accurate tonality estimates of audio signals.

It is to be noted that the LPC analysis windows may have different lengths. By varying the analysis window length, a desired variable time-frequency framework may be flexibly realized. According to some embodiments, an LPC analysis window length is varied as a function of the frequency band. In some embodiments, a relatively longer LPC analysis window is used for relatively lower frequency bands.

According to some embodiments, a prediction order of the LPC is varied as a function of the frequency band. By way of example, the prediction order of the LPC may be chosen such that discrimination between pure noise input and signals with tonal components (harpsichord, speech, etc.) is maximized.

It is to be noted that the frequency range of an audio signal may be coded to different ranges.

According to some embodiments, the frequency range of the audio signal is between 200-7000 Hz.

According to some embodiments, the step of determining a hearing threshold in quiet for the frequency band comprises using a predefined table defining the hearing threshold for at least some frequencies. The predefined table can be pre-stored in an encoder performing the method, thus allowing the predefined table to be updated without impacting decoder compatibility. Advantageously, the complexity of providing a high quality encoded audio signal may be reduced.

According to some embodiments, a dynamic range of the audio signal is reduced using a companding algorithm prior to quantizing audio samples of the audio data of the frequency bands. By companding the audio signal in the encoder and applying the complementary expansion in the decoder, the encoding method may provide a higher-quality decoded audio signal. Companding the audio signal may allow for fewer bits to code while maintaining high audio quality.

According to some embodiments, the method comprises the step of defining a spreading function for the frequency band depending on sensation level such that the effect of a spreading function in a frequency band with a relatively higher sensation level is larger compared to an effect of the spreading function in a frequency band with a relatively lower sensation level.

According to a second aspect, at least one of the above objects are achieved by a device comprising:
- a receiving component configured to receive an audio signal, the audio signal comprising audio data in a plurality of frequency bands;
- an analysis component configured to determine a plurality of frequency bands of the audio signal;
- the analysis component further being configured to, for each frequency band of the plurality of frequency bands;
  - determine an energy value for the audio data of the frequency band;
  - determine a hearing threshold in quiet for the frequency band;
  - calculate a sensitivity value, SV, for the frequency band using the energy value and the hearing threshold in quiet;
  - compute a masking threshold for the frequency band using the sensitivity value and the energy value;
  - determine a bit allocation value of the frequency band using the energy value and the masking threshold value.

According to some embodiments the analysis component is configured to compute the masking threshold by applying a spreading function to one of:
the energy values for the frequency bands; or
transformed energy values of the frequency bands;
to determine an excitation value for the frequency band, and combine the sensitivity value with the excitation value According to some embodiments, the analysis component is configured to compute the masking threshold by combining the energy value and the sensitivity value to determine an intermediate threshold value, and applying a spreading function to the intermediate threshold value to determine the masking threshold.

According to some embodiments, wherein the device is an encoder, the device further comprises an encoding component configured to quantize audio samples of the audio data of the frequency band in response to the bit allocation value.

According to some embodiments, the encoding component is further configured to encode the quantized audio data of the frequency band into a bitstream.

According to some embodiments, wherein the device is a decoder, the audio signal is an encoded bitstream comprising an encoded energy value for the frequency band, and the device further comprises a decoding component configured to decode the encoded energy value from the encoded bitstream, and the analysis component uses the decoded energy value when determining the energy value.

According to some embodiments, the decoding component is configured to extract quantized audio samples of the audio data of the frequency band from the encoded bitstream in response to the bit allocation value.

According to some embodiments, the decoding component is further configured to dequantize the quantized audio samples of the audio data of the frequency band and combine the dequantized audio samples of the audio data of each frequency band to generate a decoded audio signal.

According to some embodiments, the analysis component is configured to: when determining the bit allocation value, adjust the masking threshold to achieve a bit allocation that satisfies a target bitrate for the audio signal.

According to some embodiments, the analysis component is configured to: when adjusting the masking threshold, adjust the masking threshold by adding a constant offset to the masking threshold in the loudness domain until the target bitrate for the audio signal is satisfied.

According to some embodiments, the analysis component is configured to define the energy value, hearing threshold in quiet and masking threshold in decibels, dB.

According to some embodiments, the analysis component is configured to determine the plurality of frequency bands of the audio signal in accordance with the Equivalent Rectangular Bandwidth, ERB, scale.

According to some embodiments, wherein the SV is defined in dB as a subtractive adjustment to the excitation function, the analysis component is configured to determine a bit allocation value by assigning more bits for a frequency band having a higher SV compared to said frequency band having a lower SV.

According to some embodiments, the analysis component is configured to calculate an SV for the frequency band by calculating a first SV using a sensation level, the sensation level being a difference between the energy value and the hearing threshold in quiet.

According to some embodiments, the analysis component is configured to calculate the first SV by multiplying the sensation level with a first scalar.

According to some embodiments, the first scalar is frequency dependent.

According to some embodiments, the first scalar is constant over all frequency bands.

According to some embodiments, the analysis component is configured to calculate the first SV by adding a second scalar to the sensation level multiplied with the first scalar.

According to some embodiments, the analysis component is configured to calculate the SV by using the first SV as the SV for the frequency band.

According to some embodiments, the analysis component is configured to calculate the SV for the frequency band by further calculating a second SV using the sensation level and weighting the first and second SV based on at least one characteristic of the audio signal.

According to some embodiments, the analysis component is configured to calculate the second SV for the frequency band by multiplying the sensation level with a third scalar different from the first scalar.

According to some embodiments, the analysis component is configured to calculate the second SV by adding a fourth scalar to the sensation level multiplied with the third scalar, the fourth scalar being different from the second scalar.

According to some embodiments, the analysis component is configured to perform the weighting the first and second SV based on at least one characteristic of the audio signal by calculating a value representing the weight, the value ranging between 0-1, and calculating the SV for the frequency band by multiplying one of the first and the second SV with the value and multiplying the other one of the first or the second SV with one minus the value, and adding the two resulting sums together to form the SV for the frequency band.

According to some embodiments, the at least one characteristic defines an estimated tonality of the frequency band of the audio signal.

According to some embodiments, the at least one characteristic defines an estimated level of noise in the frequency band of the audio signal.

According to some embodiments, the analysis component is configured to calculate the estimated tonality using adaptive prediction of frequency coefficients calculated from the frequency band of the audio signal.

According to some embodiments, the analysis component is configured to adaptively apply LPC to the MDCT coefficients based on a frequency band of the audio signal from which the MDCT coefficients are calculated.

According to some embodiments, an LPC analysis window length is varied as a function of the frequency band.

According to some embodiments, a relatively longer LPC analysis window is used for relatively lower frequency bands.

According to some embodiments, a prediction order of the LPC is varied as a function of the frequency band.

According to some embodiments, a frequency range of the audio signal is between 200-7000 Hz.

According to some embodiments, the device further comprises a memory, the memory storing a table defining the hearing threshold in quiet for at least some frequencies, and the analysis component is configured to determine the hearing threshold in quiet for the frequency band by using the predefined table.

According to some embodiments, the device further comprises a companding component configured to reduce a dynamic range of the audio signal using a companding algorithm prior to quantizing audio samples of the audio data of the frequency bands.

According to some embodiments, the analysis component is configured to define a spreading function for the frequency band depending on the sensation level such that the effect of spreading function in a frequency band with a relatively higher sensation level is larger compared to an effect of spreading function in a frequency band with a relatively lower sensation level.

According to some embodiments, the device is implemented in a real time two-way communication device.

The second aspect may generally have the same advantages as the first aspect.

According to a third aspect, there is provided a method for estimating a tonality of an input signal, comprising the steps of:
applying a filterbank to achieve a set of frequency coefficients;
calculate the estimated tonality using adaptive prediction of the frequency coefficients.

According to some embodiments, the step of calculating an estimated tonality comprises applying adaptive linear prediction, LPC, to the frequency coefficients based on a frequency band of the audio signal from which the frequency coefficients are calculated.

According to some embodiments, an LPC analysis window length is varied as a function of the frequency band.

According to some embodiments, a relatively longer LPC analysis window is used for relatively lower frequency bands.

According to some embodiments, a prediction order of the LPC is varied as a function of the frequency band.

According to some embodiments, the filterbank comprises one of: a 128-band complex MDCT or DFT filterbank, and a 64-band complex quadrature mirror filter, CQMF, filterbank.

According to some embodiments, the LPC analysis window is an asymmetric Hamming window.

According to some embodiments, the method comprises the step of:
weighting predictability measures from the adaptive prediction according to a relative perceptual importance of each predictability measure.

According to some embodiments, the step of weighting the predictability measures contained within each time-frequency tile comprises one of: weighting based on the energy or loudness of the input signal.

According to some embodiments, the method further comprises the step of:
combining predictability measures from the adaptive prediction of the frequency coefficients to match time and frequency resolution of the filterbank.

It is further noted that the disclosure relates to all possible combinations of features unless explicitly stated otherwise.

BRIEF DESCRIPTION OF THE DRAWINGS

The above, as well as additional objects, features and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION OF EMBODIMENTS

Figure 1:
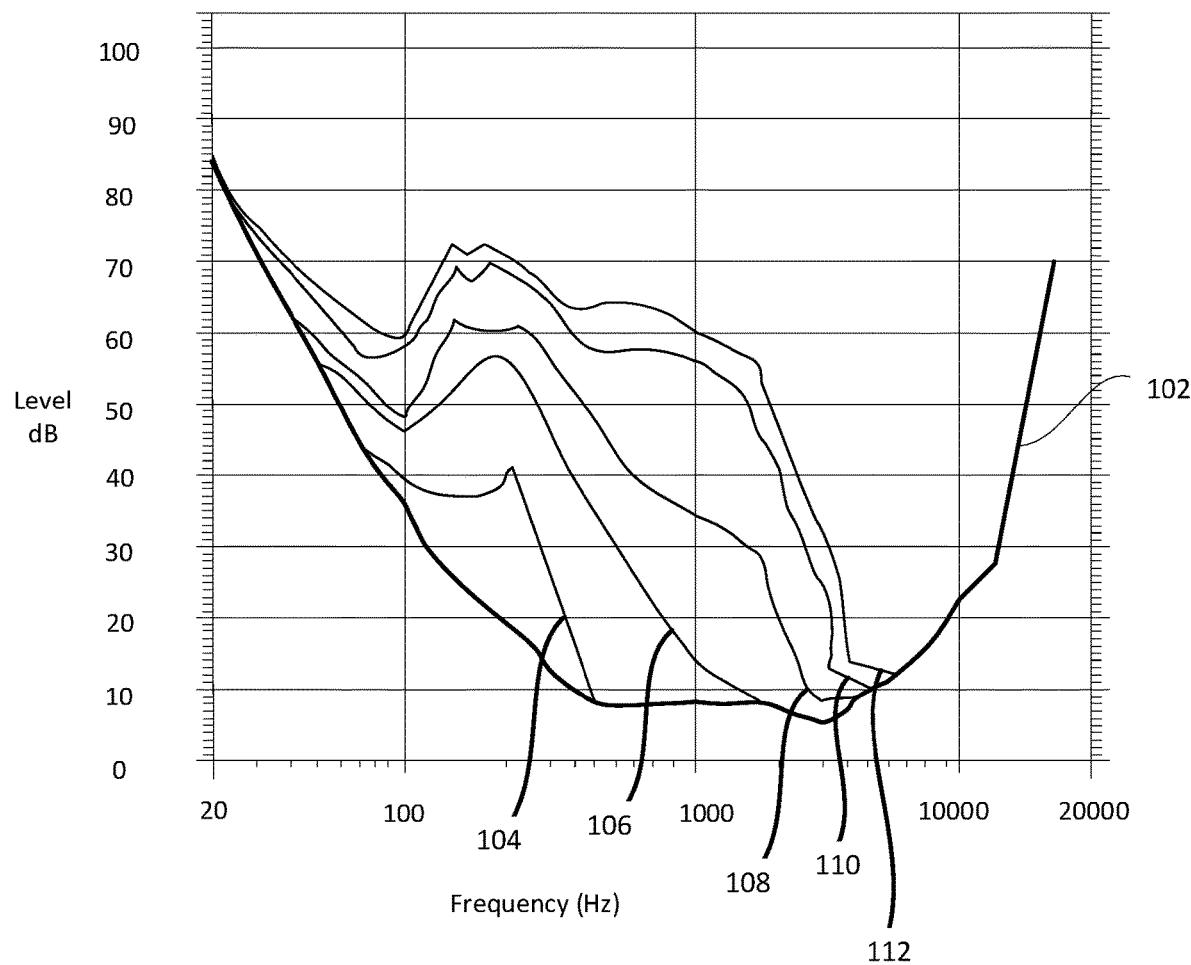
FIG. 1 shows masking data for audio signals.

The present disclosure will now be described more fully hereinafter with reference to the accompanying drawings, in which embodiments of the disclosure are shown. The systems and devices disclosed herein will be described during operation.

In the below, a known audio format will be used as context for exemplifying the present disclosure. However, it should be noted that the scope of the disclosure is not limited to this known format, and the different embodiments described herein may be employed for any suitable audio format.

For the exemplary format, there are currently two commonly used modes for coding audio. Having to choose which mode is most suitable for an audio signal can be a complex decision, and quality of the encoded audio signal may suffer if a mode is chosen which is not well-suited to the audio signal. The two typical modes are default and applause. Current modes are distinct and in both modes, the encoder estimates a masking threshold from an energy estimate of the signal and an SV that is invariant with signal level, except for the application of a threshold in quiet at the end. The default mode additionally applies a legacy function inherited from an MPEG Layer III encoder, but the perceptual justification for this function is not well grounded. Further, the masking threshold is input to a rate control loop which selects a scale factor (and quantization level) for each one of multiple scale factor bands. Thereby the performance depends on how close the masking threshold estimate is to the true JND noise level.

In most prior-art models, expressions of the required SMR for JND, prior to application of a threshold in quiet, are level-independent. Such models are typically based on masking data for relatively loud or relatively quiet signals, but not both adaptively. This approach can limit codec performance, in one example, by underestimating the true JND threshold for low-level signal components, yielding an over allocation of bits to frames containing relatively quiet signal passages. This issue arises for encoders running in constant bit-rate mode with a bit-reservoir, as well as variable bit-rate encoders. Audio content characterized by very dynamic level changes (such as speech) will be adversely affected.

A common issue with prior art models is that they produce a lower than necessary masking threshold, also leading to over-allocation of bits within a frequency band. Accordingly, this reduces the number of available bits for other bands, thereby reducing quality of encoded audio signals.

The present disclosure is aimed at circumventing some of the above mentioned issues by providing a single model that performs equally or better on most audio content than prior art dual mode model or single model through estimating a more accurate SMR.

Subjective listening tests using monophonic content indicate that the new encoder outperforms the current one on speech content. Furthermore, the new encoder is significantly more effective in variable bitrate applications where the encoder allocates only the number of bits necessary to meet a predefined quality target, providing constant audio quality.

In one experiment, a first subjective listening test was performed with three encoders, one operating in the default mode, one operating in the applause mode, and one operating using level-dependent masking, and a diverse set of audio test items, to quantify the benefits of level-dependent masking. The encoder using level-dependent masking yielded an increase in mean subjective quality by an average of 3 and 14 points relative to the default and applause mode encoders, respectively. More significantly, level-dependent masking improved two speech items by an average of 8 points relative to the default encoder.

Figure 7:
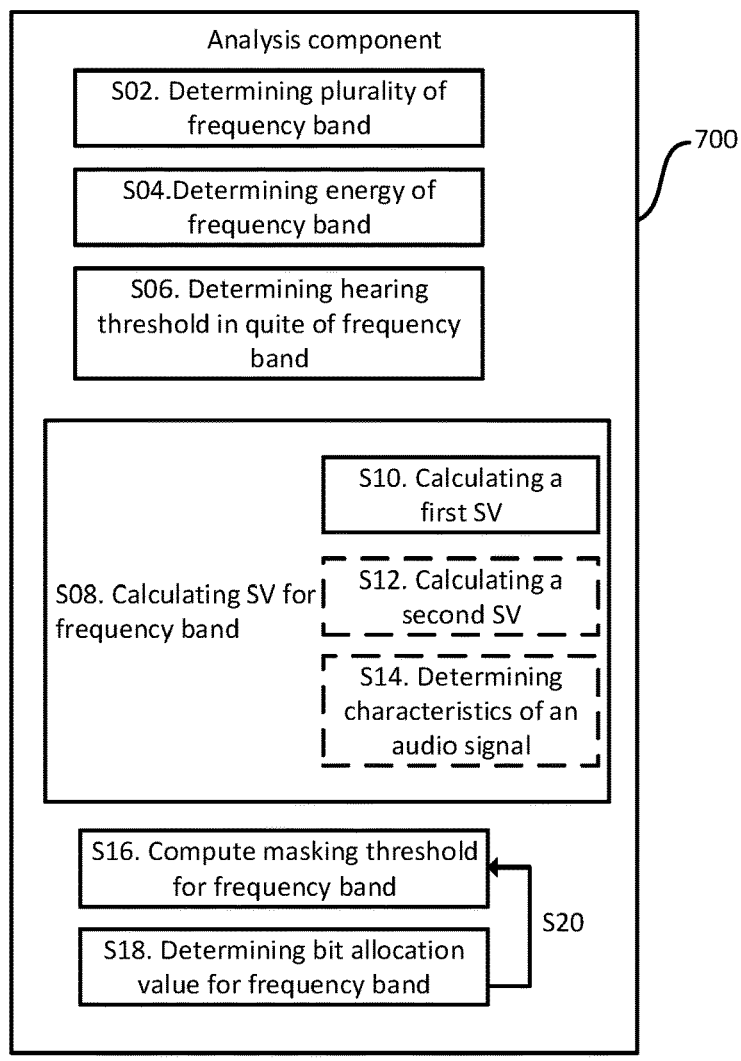
FIG. 7 shows an analysis component for determining a bit allocation values of frequency bands of an input audio signal according to some embodiments.

FIG. 7 shows by way of example an analysis component 700. As will be described further below in conjunction with FIGS. 8 and 9, the analysis component may be implemented in an encoder 800 or a decoder 900. In other embodiments, the analysis component is implemented in a separate device and for example connected to an encoder or a decoder.

The analysis component 700 comprises circuitry configured to perform a method for processing an audio signal, to determine a bit allocation value for frequency bands of the audio signal. The circuitry may comprise one or more processors.

The analysis component 700 is configured to execute a variety of actions that will be exemplified below.

The analysis component 700 is configured to determine S02 a plurality of frequency bands of an input audio signal. The plurality of frequency bands each comprise a frequency range. It should be noted that the each of the plurality of frequency bands of the audio signal to be encoded does not necessarily need to have the same width/range. In one example, a first, relatively lower, frequency band may have a range of 100-200 Hz, while another, relatively higher, frequency band may have a range of 3000-3500 Hz. In one embodiment, the frequency range of the audio signal may be 200-7000 Hz. Further, it should be noted that there are many different frequency ranges for audio signals, which may extend to frequencies higher than 7000 Hz and/or lower than 200 Hz. As understood, there are different ways of determining frequency bands for an audio signal. In one embodiment, the analysis component 700 is configured to determine S02 the frequency bands in accordance with the Equivalent Rectangular Bandwidth, ERB, scale. The ERB scale gives an approximation to the bandwidths of the filters of the human hearing system. Moreover, using the ERB scale provides a simplification of modelling the filters as rectangular band-pass filters.

The analysis component is further configured to determine S18 a bit allocation value of each frequency band using the following analysis of audio data of each frequency band.

The analysis component 700 determines S04 an energy value for the audio data of the frequency band. The energy value may for example be a banded MDCT energy.

Further, the analysis component 700 determines S06 a hearing threshold in quiet for the frequency band. In one embodiment, the analysis component 700 comprises a memory component or is connected to such component. The memory component stores a table defining the hearing threshold in quiet for at least some frequencies. It is to be noted that such memory component can store different information. In other words, determining S06 a hearing threshold in quiet for the frequency band can comprise using a predefined table defining the hearing threshold for at least some frequencies. In some embodiments, the predefined table defining the hearing threshold may be replaceable, allowing for improvements to be made to the encoder without impacting decoder compatibility.

Using the energy value and the hearing threshold in quiet, a sensitivity value (SV) can be calculated S08. It is to be understood that the SV can be calculated S08 in different ways using the energy value and hearing threshold in quiet. An SV can for example be calculated S08 using a ratio between the energy value and hearing threshold in quiet, or a difference, or any other metric comparing the energy value and the hearing threshold in quiet. Sensitivity value is to be understood as a quantity, for example defined in dB.

In one embodiment, a first SV is calculated S10 using a difference between the energy value and the hearing threshold in quiet, in this disclosure also referred to as "sensation level". Optionally, the first SV may be calculated S10 by multiplying the sensation level with a first scalar. In some embodiments, the first SV may be calculated S10 by adding a second scalar to the difference multiplied with the first scalar. In this embodiment, the first SV for a frequency band is thus calculated as alpha*(band energy−hthresh)+beta, where alpha is the first scalar, beta is the second scalar, band energy is the energy value audio signal in of the frequency band, and hthresh is the threshold in quiet for the frequency band. In some embodiments, the second scalar is not included in the calculation of the SV, for reducing the complexity.

Figure 2:
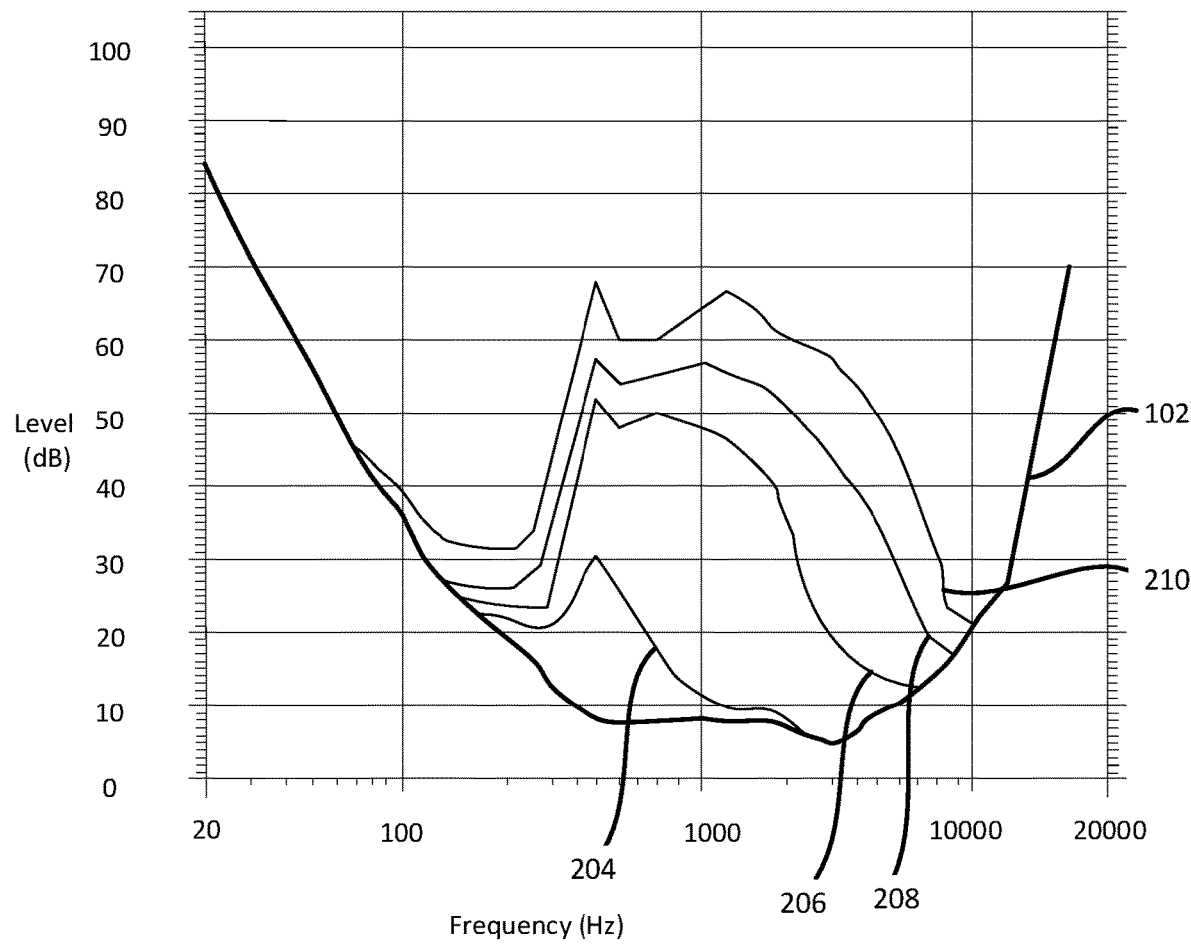
FIG. 2 shows masking data for audio signals.
Figure 3:
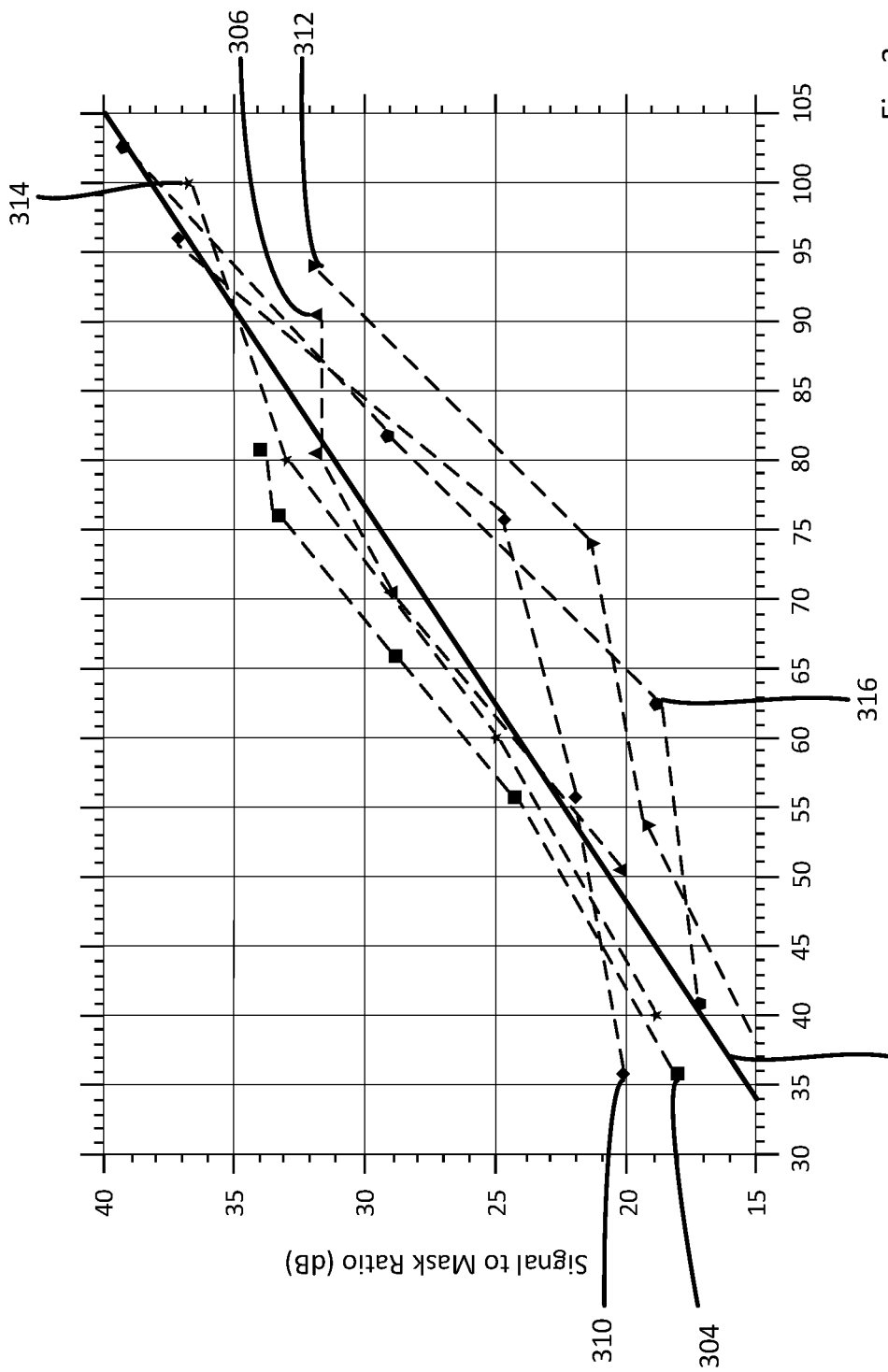
FIG. 3 shows experimental data of signal to mask ratio, SMR, in relation to sensation level for a variety of tones at different frequencies, and a straight line model of the data.

The degree that the first SV varies with the difference between the energy value and threshold in quiet for different frequency bands is determined by examining a variety of measured masking data. It should be noted that the below measurements and diagrams, described in conjunction with FIGS. 1-3, are provided by way of example, using the difference between the energy value and the hearing threshold in quiet at each frequency band, i.e. the sensation level. However, the skilled person understands that if other ways of calculating the SV were employed, for example using a ratio between the energy and the hearing threshold for each frequency band, other data would result from the experiments.

FIG. 1 shows by way of example measured masking data for 200 Hz tones at different sound pressure levels, SPL. The masking thresholds 104, 106, 108, 110, 112, are presented in relation to the hearing threshold in quiet 102 (bolded line). A masking threshold 1 104 relates to a 200 Hz tone at 60 dB SPL. A masking threshold 2 106 relates to a 200 Hz tone at 80 dB SPL. A masking threshold 3 108 relates to a 200 Hz tone at 90 dB SPL. A masking threshold 4 110 relates to a 200 Hz tone at 100 dB SPL. A masking threshold 5 112 relates to a 200 Hz tone at 105 dB SPL. As can be seen from FIG. 1, the difference between the level of the tone masker (i.e. at 60, 80, 90, 100 and 105 dB, not specifically indicated in FIG. 1, but easily seen by following the markings on the vertical axis from the respective sound level to the 200 Hz marking on the horizontal axis) and the masking threshold at 200 Hz increases for an increasing sound intensity of the tone masker. For the 60 dB tone masker, the difference is approximately 18 dB (60 dB for the tone masker and 42 dB for the masking threshold 104), and for the 105 dB tone masker, the difference is around 32 dB (105 dB for the tone masker and 73 for the masking threshold 112).

FIG. 2 shows a similar pattern for a 500 Hz tone masker. In FIG. 2, the masking thresholds 204, 206, 208, 210, for masking data at different sound pressure levels, SPL, (at the same levels as in FIG. 2 except that the 105 dB tone masker is not shown in FIG. 2) is presented in relation to the hearing threshold in quiet 102 (bolded line).

In one example, measured masking data (i.e. as exemplified in FIGS. 1 and 2) may be used to derive a sensitivity value, SV, versus a sensation level, when tonal or sinewave signals are considered. As understood, there are other possible parameters than exemplified in FIG. 1-2 that may be used to derive required SV. In this example, the masking for coding artifacts within the auditory critical band at the sinewave masker frequency was considered.

FIG. 3 shows by way of example a model of SMR as a merger of tone masking narrowband noise for different tone sensation levels and frequencies. The SMR is presented as a function of sensation level with a straight-line model 302. The straight-line model 302 is a merger of measured SMR curves 1-6, referred to as 304, 306, 310, 312, 314, 316 in FIG. 3. Curve 1 304 shows measured SMR values for a signal at a frequency of 200 Hz. Curve 2 306 shows measured SMR values for a signal at a frequency of 500 Hz. Curve 3 310 shows measured SMR values for another signal at a frequency of 500 Hz. Curve 4 312 shows measured SMR values for a signal at a frequency of 1000 Hz. Curve 5 314 shows measured SMR values for a signal at a frequency of 2000 Hz. Curve 6 316 shows measured SMR values for a signal at a frequency of 5000 Hz.

FIG. 3 shows that, for this example, an SMR versus sensation level slope of 0.35 dB*(masker level relative to the threshold in quiet at that frequency)+3 dB may be a reasonable approximation for the frequency range 200-4,000 Hz. However, it is to be noted that the straight-line model 302 in FIG. 3 may be a reasonable approximation for other frequency ranges. In this example the decibel offset for the required SMR varies as much as 10 dB at mid-levels but appears to converge at high and low levels.

In some embodiments, the threshold in quiet may be modified by setting the threshold for all bands below 4 kHz to the global minimum threshold. The threshold in quiet should be set to the minimum value within each band when encoding. For example, in a transform codec with adaptive block switching, the lowest frequency band of the shortest transform block may be 750 Hz wide. As can be seen in FIG. 1-2, the level (in dB) of the hearing threshold in quiet drops quickly from 20-750 Hz. The threshold of this entire band could then be set to the actual threshold in quiet at 750 Hz. The same step is applied for all other bands in the shortest block. Then these values are interpolated to obtain thresholds in quiet for all other transform block lengths. This approach ensures the threshold in quiet is at a consistent level for all block lengths, and avoids undesired quantization noise modulation artifacts when the codec switches transform lengths. An alternative, simpler approach is to set the thresholds for all bands below 4 kHz to the global minimum threshold. Using this adjusted threshold in quiet would result in other values for the first and/or second scalar, as understood by the skilled person.

It should be noted that the threshold in quiet in FIGS. 1-2 is conservatively placed 20 dB below where it would be under the conventional assumption of a peak playback level of 105 dB SPL. In one embodiment, the threshold is set based on a peak playback level of 115 dB. This provides a degree of robustness, especially for variable bit-rate applications, when playing decoded audio at a level that differs from the assumed level.

The model in FIG. 3 is derived by averaging results of tone masking narrowband noise experiments for various frequencies. Signal components with higher sensation level receive higher SVs. In one example, for each 3 dB increase in band energy above the hearing threshold in quiet, the SV is increased by 1 dB. The level-dependent SV model in FIG. 3 for frequency band j, SV(j), is expressed as:

$$SV(j)=\max(0,0.35*(Eb(j)-Q(j))+3)$$

where Eb(j) and Q(j) (in this example expressed in dB) are the banded MDCT energy and the threshold in quiet, respectively.

As understood, it would be obvious to change the scalars presented in the above stated equation by changing the configuration of the analysis component. The scalars may be modified to adjust the calculation of SV to better fit some audio signals. The first scalar may for example be ranging between 0.2 and 0.5. The second scalar may for example be ranging between 2.5 and 3.5.

In the model of FIG. 3, the first scalar and the second scalar are constant over all frequency bands. However, in other embodiments, the first and/or second scalar is/are frequency dependent.

In one embodiment a first SV is calculated S10 and used as an SV for the frequency band, as shown in FIG. 3.

In one embodiment, the straight-line model 302 in FIG. 3 is extended to more accurately estimate an SV for input signals with high levels of noise. Some examples of input signals with a high level of noise may be applause, or rain, or speech sibilants. However, as understood there are many different signals with high levels of noise. By way of example, in using the same methodology as the tone-masking-noise case, the SV can be calculated to be more accurate for some signals.

In a second embodiment, it is suggested that the same straight-line relationship exists between SV and the sensation level with high levels of noise, but with a different slope. The slope of the best-fit line is roughly one-half that for the tone-masking-noise case. This correspondence has been verified using similar experiments as shown in FIG. 1-3 but for a noise masker instead of a tone masker. Therefore, a generalized model can be realized by adapting the SV rule depending on input signal characteristics.

Consequently, in one embodiment an optional second SV is calculated S12 and combined, optionally using a fixed or adaptively weighted combination, with the first SV to define the final SV. In these embodiments, the analysis component 700 is further configured to, when calculating S08 the SV for the frequency band, calculate S12 a second SV using a difference between the determined S04 energy and the determined S06 hearing threshold in quiet (the sensation level), and weighting the first and second SV based on at least one determined S14 characteristic of the input audio signal. As understood, any suitable characteristic of an audio signal can be used for the calculation S08 of the SV. In one embodiment, the at least one characteristic is an estimated tonality of the signal. Alternatively, in one embodiment, the at least one characteristic is an estimated level of noise for the signal.

In one embodiment, the estimated tonality is calculated using adaptive prediction of frequency coefficients calculated from the frequency band of the audio signal. Below, embodiments for estimating tonality of an audio signal will be described.

As understood, any set of frequency coefficients is possible to use. By way of example, one prior-art method is based on 2nd order fixed prediction of DFT magnitude and phase across time (ISO/IEC 11172-3:1993(E), "Information technology—Coding of moving pictures and associated audio for digital storage media at up to about 1.5 Mbit/s—Part 3: Audio."). According to this method, to enable different time/frequency resolution tradeoffs for different frequencies, overlapped DFTs of length 512 and 128 (i.e. the number of complex DFT coefficients) are computed in parallel. The analysis component 700 may generalize the prior-art method to use adaptive linear prediction of complex MDCT (CMDCT) coefficients. In some embodiments, linear prediction coding (LPC) may be adaptively applied to MDCT coefficients based on a frequency band of the audio signal from which the MDCT coefficients are calculated. Adaptive linear prediction allows rapidly-evolving mid-range harmonics in voiced speech and music to generate higher tonality estimates than fixed prediction. In addition, the desired variable time/frequency framework can be flexibly realized, without the need for a parallel CMDCT filterbank, by varying the LPC analysis window length and/or the prediction order as a function of frequency. In other words, the LPC analysis window length may by varied as a function of the frequency band. Further, the prediction order of the LPC may also be varied as a function of the frequency band. Optimal LPC analysis parameters may be selected offline for each frequency band by maximizing the difference in average prediction gain for challenging signals and independent and identically distributed (IID) Gaussian noise. Examples of challenging signals may be speech or harpsichord. However, it is to be understood that there are many different signals that can be classified as challenging. The longest LPC analysis windows are typically used at low frequencies, while progressively shorter ones are used at higher frequencies. In other words, a relatively longer LPC analysis window may be used for relatively lower frequency bands in order to capture the longer periodicity of such signals. The LPC analysis parameters provide a flexible means for controlling the quantization noise shaping characteristics of the encoder.

Embodiments of how to estimate a tonality of an audio signal will be further described below in conjunction with FIG. 6.

In some embodiments, the weighting of the first and second SV, is based on a tonality estimate T. T is a continuous variable ranging from 0 for pure noise signals to 1 for pure sinusoids and sparse harmonic signal components. The first and second SV may thus be mixed as a linear combination with weights that sum to unity, wherein the weights depend on T. In other words, weighting the first and second SV based on at least one characteristic of the audio signal may comprise calculating a value representing the weight, the value ranging between 0-1, wherein the step of calculating S08 the SV for the frequency band comprises multiplying one of the first and the second SV with the value and multiplying the other one of the first or the second SV with one minus the value, and adding the two resulting sums together to form S08 the SV for the frequency band.

It is to be understood that the function for calculating S08 SV can be modified in different ways by modification of the scalars.

In one embodiment, the analysis component 704 is configured to use a third scalar when calculating S12 the second SV.

By way of example, the second SV may be calculated S12 by multiplying the difference with a third scalar different from the first scalar. It should be understood that the third scalar may be assigned different values. The third scalar may for example be a value ranging between 0.05 and 0.2. The third scalar may be ranging between 0.1 and 0.15.

In one embodiment, the analysis component 704 is configured to use a fourth scalar when calculating S12 the second SV.

By way of example, the second SV may be calculated S12 by adding a fourth scalar to the difference multiplied with the third scalar, the fourth scalar being different from the second scalar. It should be understood that the fourth scalar may be assigned different values. The fourth scalar may for example be ranging between 3.5 and 4.5. The fourth scalar is typically set in accordance with the threshold in quiet.

It should be noted that the second and fourth scalars can vary a lot depending on the setting for the threshold in quiet. An important aspect of these terms is that they allow trading the number of bits allocated to tonal vs. noise-like signals. They are also useful for calibrating the model such that noise allocated exactly to the level and shape of the masking threshold is only just noticeable to an average listener.

In one embodiment the analysis component is configured to calculate S12 the second SV by multiplying the difference with 0.15 and adding 4 to the result.

Then, by way of example, the overall SV may be calculated S08 as a weighted combination of the SV rules for pure sinusoids and pure noise signals, for example:

$$SV(j)=\max(0,T*(0.32*(Eb(j)-Q(j))+3)+(1-T)*(0.13*(Eb(j)-Q(j))+4)).$$

Figure 5:
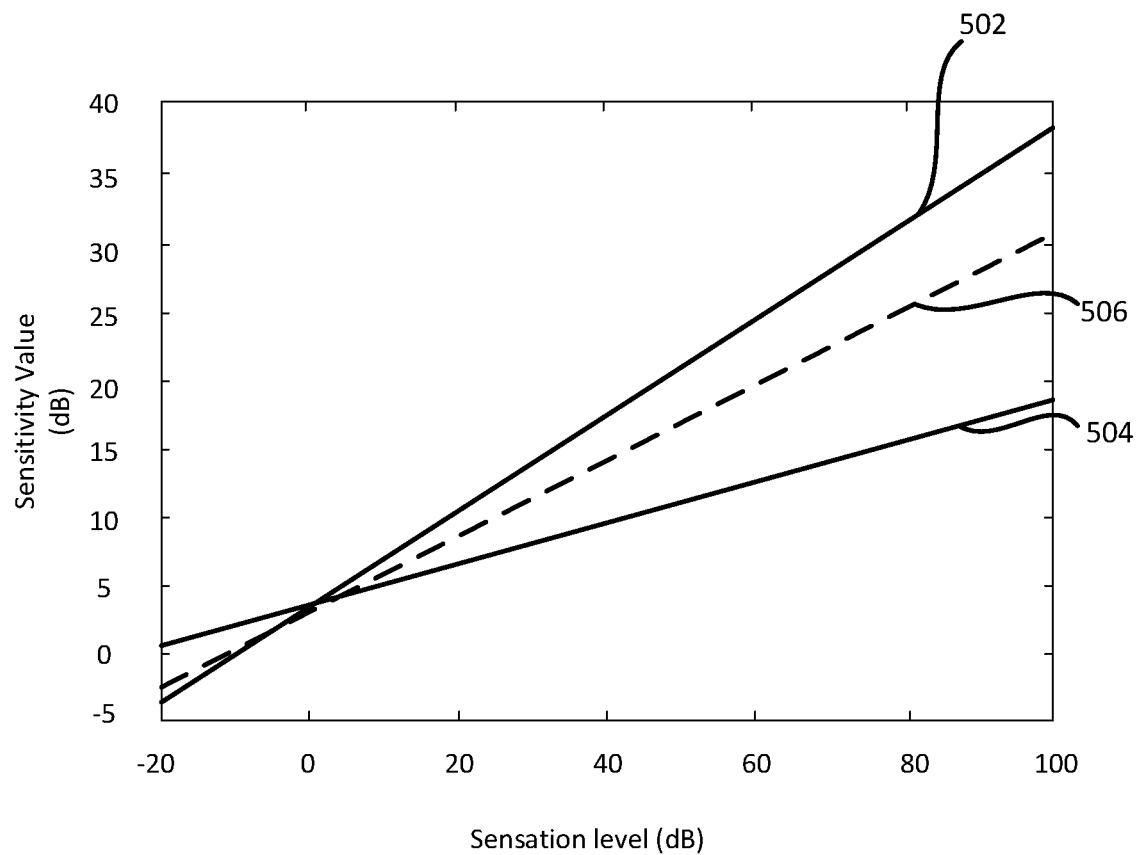
FIG. 5 shows SV in relation to sensation level for pure tones and pure noise according to some embodiments.

FIG. 5 shows SV versus sensation level models for three different signal types. The tonal SV model 502 depicts model behaviour for signals having T=1. The noise SV model 504 depicts model behaviour for signals having T=0. The mixed tone and noise SV model 506 depicts model behaviour when T=0.65.

Accordingly, the analysis component 700 can be configured to blend between the tone-masking and noise-masking models. In other words, for very tone-like signals, the encoder will primarily use configurations suitable for tone-like signals. For very noise-like signals, the encoder will primarily use configurations suitable for noise-like signals. For signals in between, the encoder will use a blend of the configurations, with the proportions of the tone-like and noise-like configurations depending on in-band tonality.

Returning to FIG. 7; Using the sensitivity value and the energy value, a masking threshold may then be computed S16, which subsequently can be used, in combination with the energy value, for determining S18 a bit allocation value of the frequency band.

Advantageously the analysis component 700 computes S16 the masking threshold by subtracting a variable offset (sensitivity value) from the signal energy or values calculated based on the signal energy. The variable offset is, as discussed above, based on e.g. a difference (sensation level) between the energy value and hearing threshold quiet. Specifically, as the sensation level increases, the variable offset increases, and vice versa. Such a way of calculating a masking threshold provides a better match to subjectively measured masking data, and therefore results in an improved allocation of bits. The improvement in subjective quality of the decoded audio signal may be most noticeable for higher-level signals. Prior art models using a level-independent offset produce a lower than necessary masking threshold for quieter signals, leading to an over-allocation of bits and consequently reducing the available number of bits for other bands and other frames containing louder signal components.

By way of comparison, prior art models typically simply determine the masking threshold by subtracting a fixed offset from the in-band signal energy. For example, in some cases the same offset is used regardless of how close the band energy is to the hearing threshold. The analysis component 700 instead determines the masking threshold by subtracting a variable offset from the signal energy.

The masking threshold may be computed S16 in different ways. In one embodiment, computing the masking threshold comprises applying a spreading function to one of: the linear energy values for the frequency bands; or transformed energy values of the frequency bands. In other words, in one embodiment, the spreading function is applied to the energy values for the frequency bands. In another embodiment, the energy values are first transformed before the spreading function is applied. The transformation may comprise transforming the linear energy values to the loudness domain by raising the energy values to a power of ~0.25-0.3. The transformation may alternatively comprise raising the energy values to a power of 0.5-0.6 which has been found to provide even better sound quality for some audio formats.

Thereby, an excitation value is determined for the frequency band. The excitation value is then combined with the sensitivity value to compute the masking threshold. In the dB scale, the combining of the sensitivity value and excitation value comprises subtracting the sensitivity value from the excitation value. In the intensity domain, a division is used instead.

In another embodiment, the spreading function is applied after combining the energy value and the sensitivity value to determine an intermediate threshold value. In this embodiment, computing the masking threshold comprises combining the energy value and the sensitivity value to determine an intermediate threshold value, and applying a spreading function to the intermediate threshold value to determine the masking threshold.

Optionally, for all of the above embodiments, the masking threshold is derived by thresholding with the threshold in quiet, e.g. masking threshold=max(masking threshold, hearing threshold in quiet).

In one embodiment, the spreading function for a frequency band depends on the sensation level such that the effect of a spreading function in a frequency band with a relatively higher sensation level is larger compared to an effect of the spreading function in a frequency band with a relatively lower sensation level. Typically, the spreading functions are defined on an absolute SPL scale. Using the alternative method for defining the spreading function may provide a more generalized psychoacoustic model while incurring only minimal additional computational complexity. As of today, many encoders appear to apply spreading functions that are most appropriate for quiet signals. This is a conservative design approach, but the extent of frequency domain masking will be underestimated for louder signals, which may lead to allocating more bits than necessary in certain bands, correspondingly leaving fewer bits available for other bands and possibly resulting in reduced quality. Accordingly, the analysis component 700 may be configured to define a spreading function for the frequency band depending on a difference between the determined S04 energy value and the determined S06 hearing threshold in quiet leading to an improved allocation of bits.

In some embodiments, determining S18 the bit allocation value for a frequency band comprises calculating an SMR for the frequency band being the energy value for the frequency band subtracted by the computed S16 masking threshold for the frequency band. In some embodiments, a further fixed offset is subtracted. The determining S18 of the bit allocation value is then based on the quantity of the SMR. In some embodiments, the bit allocation value is thresholded at a defined max bit allocation value, e.g. 12 bits.

In some embodiments, determining S18 the bit allocation value comprises adjusting S20 the masking threshold to achieve a bit allocation that satisfies a target bitrate for the audio signal. Adjusting S20 the masking threshold may comprise adjusting the masking threshold by adding a constant offset to the masking threshold in the loudness domain until the target bitrate for the audio signal is satisfied. As mentioned above, transforming from the linear energy domain to the loudness domain comprises raising each energy to a power of ~0.25-0.3.

Generally, the analysis component 700 assigns S18 more bits for a frequency band having a higher SV (when SV is defined in dB as a subtractive adjustment to the excitation function) compared to if said frequency band would have a lower SV.

Figure 8:
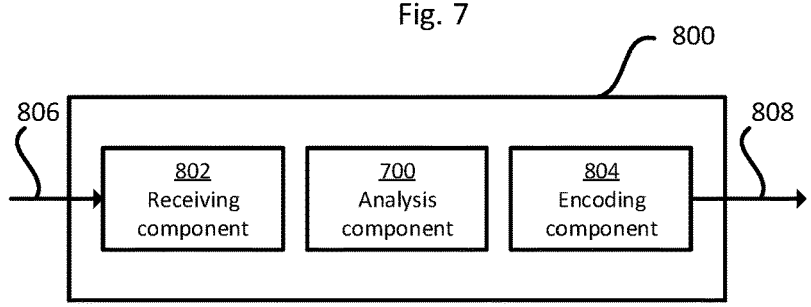
FIG. 8 shows an encoder implementing the analysis component of FIG. 7.

The analysis component 700 may in some embodiments be implemented in an encoder 800. Such embodiments are shown in FIG. 8. In this embodiment, the encoder 800 comprises a receiving component 802 configured to receive an audio signal 806. The encoder further comprises an encoding component 804 configured to use the bit allocation values determined S18 by the analysis component 700 for encoding purposes. For example, the encoding component 804 is configured to quantize audio samples of the audio data of the frequency band in response to the bit allocation value, and to encode the quantized audio data of the frequency band into a bitstream 808. In some embodiments, the encoder 800 further comprises a companding component (not shown) configured to reduce a dynamic range of the audio signal using a companding algorithm prior to quantizing audio samples of the audio data of the frequency bands. The companding feature reduces the dynamic range of input signals prior to transform coding. The companding feature may benefit the encoded quality of signals containing dense transient mixtures such as rain and applause. In one example, the input signal companding and the embodiment of only calculating S10 a first SV and using S08 this as the SV may work synergistically to produce higher performance than either feature separately. In this embodiment a dynamic range of the audio signal is reduced using a companding algorithm prior to the step of encoding the audio signal using the associated SV. The companding feature may further reduce the number of bits to code while still maintaining a high audio quality.

Figure 9:
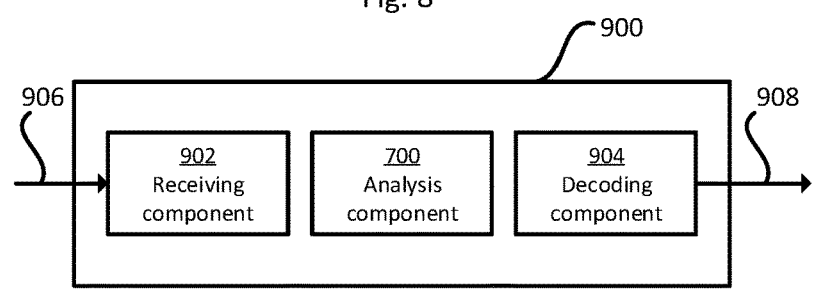
FIG. 9 shows a decoder implementing the analysis component of FIG. 7.

In some embodiments, the analysis component 700 is implemented in a decoder 900. This embodiment is shown in FIG. 9. In this embodiment, the decoder 900 comprises a receiving component 902 configured to receive an audio signal 906 being in the form of an encoded bitstream comprising an encoded energy value for the frequency bands of the audio signal. The decoder further comprises a decoding component 904 configured to use the bit allocation values determined S18 by the analysis component 700 for decoding purposes. The decoding component 904 is configured to decode the encoded energy value from the encoded bitstream 906, wherein the analysis component 700 uses the decoded energy value when determining the energy value. The decoding component 904 is further configured to extract quantized audio samples of the audio data of the frequency band from the encoded bitstream 906 in response to the bit allocation value. The decoding component 904 is further configured to dequantize the quantized audio samples of the audio data of the frequency band and combine the dequantized audio samples of the audio data of each frequency band to generate a decoded audio signal 908.

It is to be noted that the analysis component 700 and corresponding method can be used with any audio format.

Masking using the inventive methods described herein provides a better match to subjectively measured masking data, and therefore results in an improved allocation of bits. The embodiment of using the calculated S10 first SV as the SV for the frequency band provides the most improvement over a default encoder for speech signals. This is important because speech signals are a very critical element of typical broadcast and cinematic content.

In some embodiments, an encoder 800 and/or decoder 900 implementing this embodiment (or alternatively the embodiment of calculating S12 also the second SV) are implemented in a real time two-way communication device. Advantageously, the simpler embodiment may be employed in such device, given the lower complexity of such encoding method. However, it is to be noted that there are many applications and possible uses of the encoder 800 and/or decoder 900.

The encoder 800 thus accurately captures observed masking behaviour of the human hearing system. This leads to higher codec performance than default encoders for both constant bit-rate and variable bit-rate applications.

The subjective improvement may in some embodiments be most noticeable for relatively high-level signals, since default encoders that derive masking thresholds based on a level-independent offset (instead of using SV) tend to over-allocate bits to low-level signal components.

Figure 4:
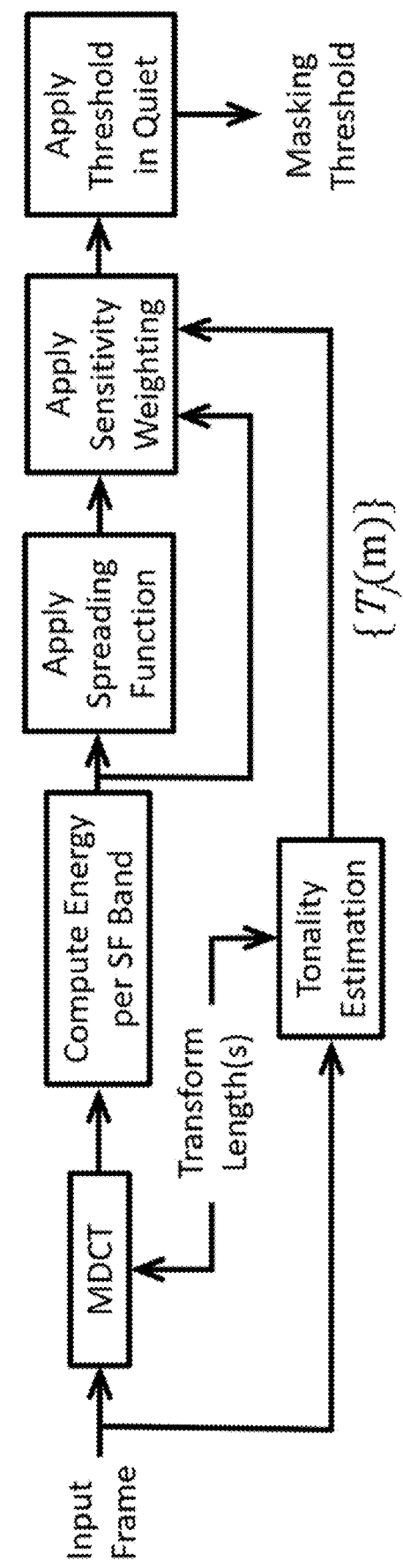
FIG. 4 shows an overview of a method for computing a masking threshold according to some embodiments.

FIG. 4 shows an overview of an exemplary method of calculating a masking threshold as described above, where a tonality estimate is used for weighting the first and second SV. As shown in FIG. 4, an input audio frame is input to an MDCT filterbank. Transform length(s) input to the MDCT filterbank are also received by the tonality estimating unit (further described below in conjunction with FIG. 6). The tonality estimating unit outputs a tonality estimate $T_j(m)$ ranging from 0-1, one set for each MDCT transform, as further described below. In this nomenclature, j is the band index and m is the MDCT block index.

The MDCT transform coefficients are used to determine an energy value for each frequency band. A spreading function is applied to the energy values of the frequency bands to derive an excitation function. In the final steps of the exemplary method of FIG. 4, as described herein, the energy values and threshold in quiet are used to compute the first and second SV, then these are weighted by the tonality estimates $T_j(m)$ and applied to the excitation values to finally produce a masking threshold value for each frequency band.

An embodiment of an adaptive-prediction based tonality estimation method will now be described in conjunction with FIG. 6.

An input frame 602 provides input samples. The filterbank 604 is configured to receive the input samples from the input frame 602. It is to be noted that there are different filterbanks 604 that can be used. In one example, a CMDCT is used where N=128. In another example a CQMF may be used where N=64. The filterbank 604 is configured to send complex frequency coefficients 606 ($X_k(n)$, band k at time n) to the LPC analysis component 608 and to an unpredictability estimating component 605. The structure of FIG. 6 is repeated for each CMDCT/CQMF band. The LPC analysis component 608 in conjunction with the unpredictability estimating component 605 is configured to provide a set of unpredictability values 609 ($\mu_k(n)$) that corresponds to the frequency coefficients 606.

Accounting for the fact that the time samples in one CMDCT block affect three adjacent CMDCT blocks, a 3-tap FIR filter is used to smooth the unpredictability estimates in the two-stage smoothing stage 620. This improves smoothness of the tonality estimates (and hence the decoded audio as well). A similar approach is employed for other filterbanks, e.g. a CQMF with N=64.

Figure 6:
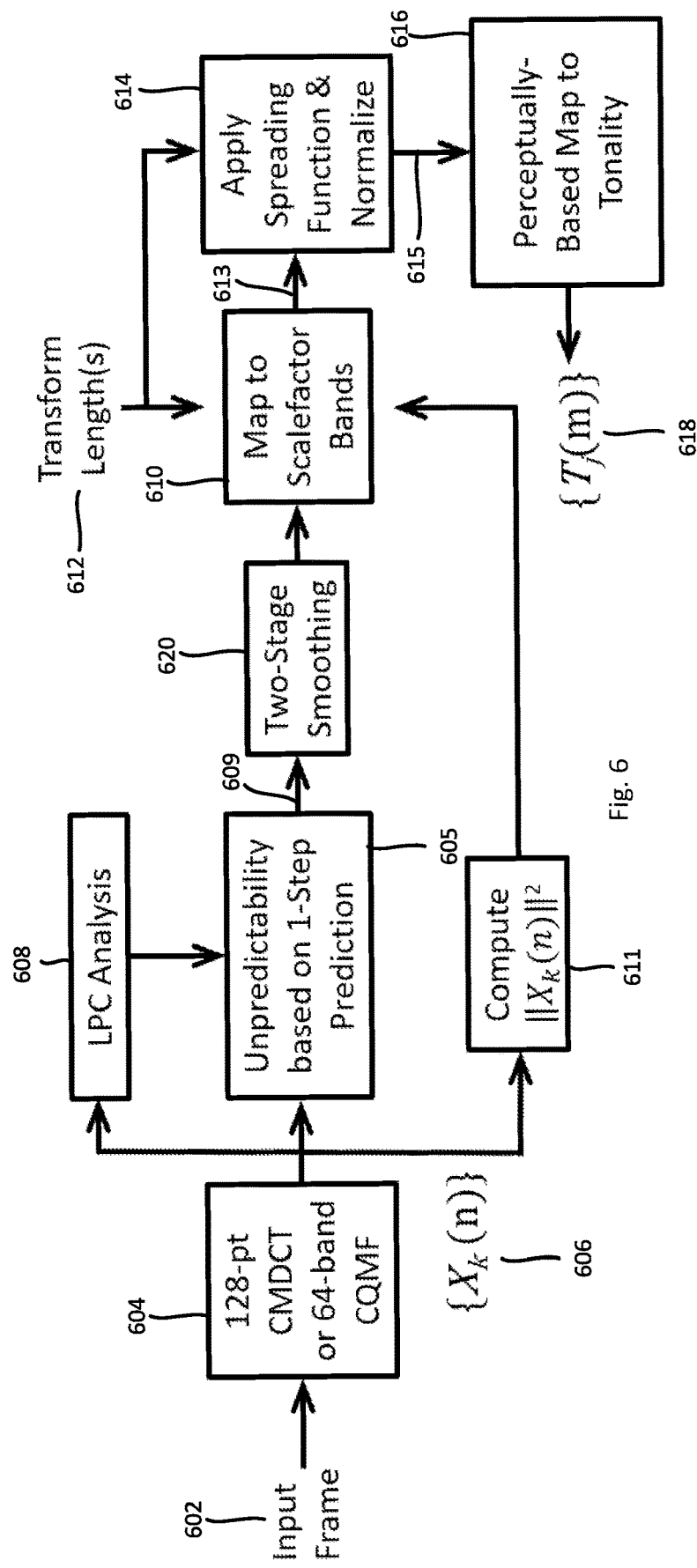
FIG. 6 shows a block diagram for estimating tonality for a frequency band of an input frame according to some embodiments.

A mapping component 610 is configured to receive the smoothed unpredictability values, the transform length 612 and the energy of the frequency band (calculated by the box 611 in FIG. 6). After the unpredictability estimates are smoothed, they are combined together across time to reflect the nonzero portion of the MDCT window to which they will later be applied. This may be important especially for dynamically changing signals such as speech, to maximize clarity of the decoded output signal. The mapping component 610 is further configured to send mapped input data 613 ($Z_k(n)$) as output data to the spreading and normalizing component 614. The spreading and normalizing component 614 is configured to apply a spreading function to the input data 613, and send a set of modified data 615 ($U_k(n)$) to the tonality mapping component 616. The tonality mapping component 616 is configured to map the input data 615 (unpredictability) to one or more sets of tonality estimates 618.

Going in to more details of FIG. 6, according to some embodiments, a sine window is applied to 50% overlapped blocks of input samples taken from one 4096-length frame 602, followed by 128-pt CMDCTs. The choice of filterbank 604 is not critical; for example, the complex QMF filterbank 604 that already exists in the known encoder could also be used. For a set of complex frequency coefficients 606 from block 604, $X_k(n)$ k=1, ..., N, a corresponding set of unpredictability values 609 is generated. The unpredictability $\mu_k(n)$ for band k at time n is defined as $$\mu_k(n) = \|X_k(n) - \hat{X}_k(n)\| / (\|X_k(n)\| + \|\hat{X}_k(n)\|)$$

where $$\hat{X}_k(n) = \sum_{i=1}^{p_k} a_{ki} X_k(n-i),$$

$a_{ki}$ is a set of $p_k$ complex prediction coefficients for the $k^{th}$ frequency band, and $p_k$ is the LPC prediction order for the same band. Unpredictability values $\mu_k(n)$ 609 range from 0 to 1 for pure tones and pure noise, respectively.

In each CMDCT frequency bin k, a group of $L_k$ consecutive coefficients $X_k(n-m)$, m=1, ..., $L_k$ is windowed and analysed to produce complex prediction coefficients of order $p_k$ ($p_k < L_k$). The prediction coefficients $a_{ki}$, i=1, ... $p_k$, are then used to compute the unpredictability values 609 corresponding to $X_k(n)$. Among the variety of LPC analysis windows evaluated, a nearly symmetric Hamming window was found to maximize prediction gains. The degree of asymmetry varies as a function of CMDCT bin. The unpredictability values for all bands are then filtered by a set of two-stage smoothing filters 620 to avoid abrupt changes across time. An example two-stage filter is comprised of a 3-tap FIR in cascade with a conventional exponential smoothing filter. The FIR filter receives unpredictability values 609 $\mu_k$ (n) and produces partially smoothed output signals $\mu_k'(n)$. The FIR output signal is then further processed by the exponential smoothing filter to produce $\mu_k''(n)$.

In one embodiment, fast-attack, slow-decay IIR filters may be used for the exponential smoothing filters. These filters provide means for controlling the attack and decay times independently. The input is in the tonality domain $(1-\mu_k'(n))$ and the difference equations are given by:

$$y_k(n) = \max((1-\mu_k'(n)), \beta_k y_k(n-1))$$

$$t_k''(n) = \alpha_k t_k''(n-1) + (1-\alpha_k) y_k(n)$$

$$\mu_k''(n) = 1 - t_k''(n)$$

where $\alpha_k$ and $\beta_k$ are the attack and decay coefficients for band k respectively, $t_k''(n)$ are smoothed tonality estimates, and $y_k(n)$ are intermediate state variables. The attack and decay time constants typically vary as a function of frequency band number. In the third equation above, the outputs of the fast-attack, slow decay filters are converted back to unpredictabilities for subsequent processing in 610.

With no smoothing, tonality estimates tend to fluctuate across consecutive transform blocks, leading to fluctuation of the masking threshold estimates. This in turn may lead to audible quantization noise modulation in the decoder output, especially at low to mid frequencies. A method that effectively resolves this issue is to design the attack/decay filter coefficients from known temporal characteristics of human auditory filters. This approach leads to attack/decay time constants that are generally longest at low frequencies and shortest at high frequencies.

In the next stage of FIG. 6, the CMDCT bin energies and smoothed unpredictability values from all CMDCT blocks are resampled and combined into groups (mapped) 610 to match the time and frequency resolution of each MDCT transform(s) in the current frame. The resampled unpredictability values 613 are weighted according to their relative perceptual importance and combined across time as required. Example perceptual weightings include the L2-norm squared (energy) and loudness. Next, in order to match spreading applied to the banded MDCT energies, the unpredictability values are spread across frequency by applying a spreading function 614, e.g from ISO/IEC 11172-3:1993(E). In the final step, the resampled, spread, and normalized unpredictability values 615 are mapped 616 to one or more sets of tonality estimates 618 in the range from 0 to 1, inclusive—one set for each MDCT transform.

Figure 10:
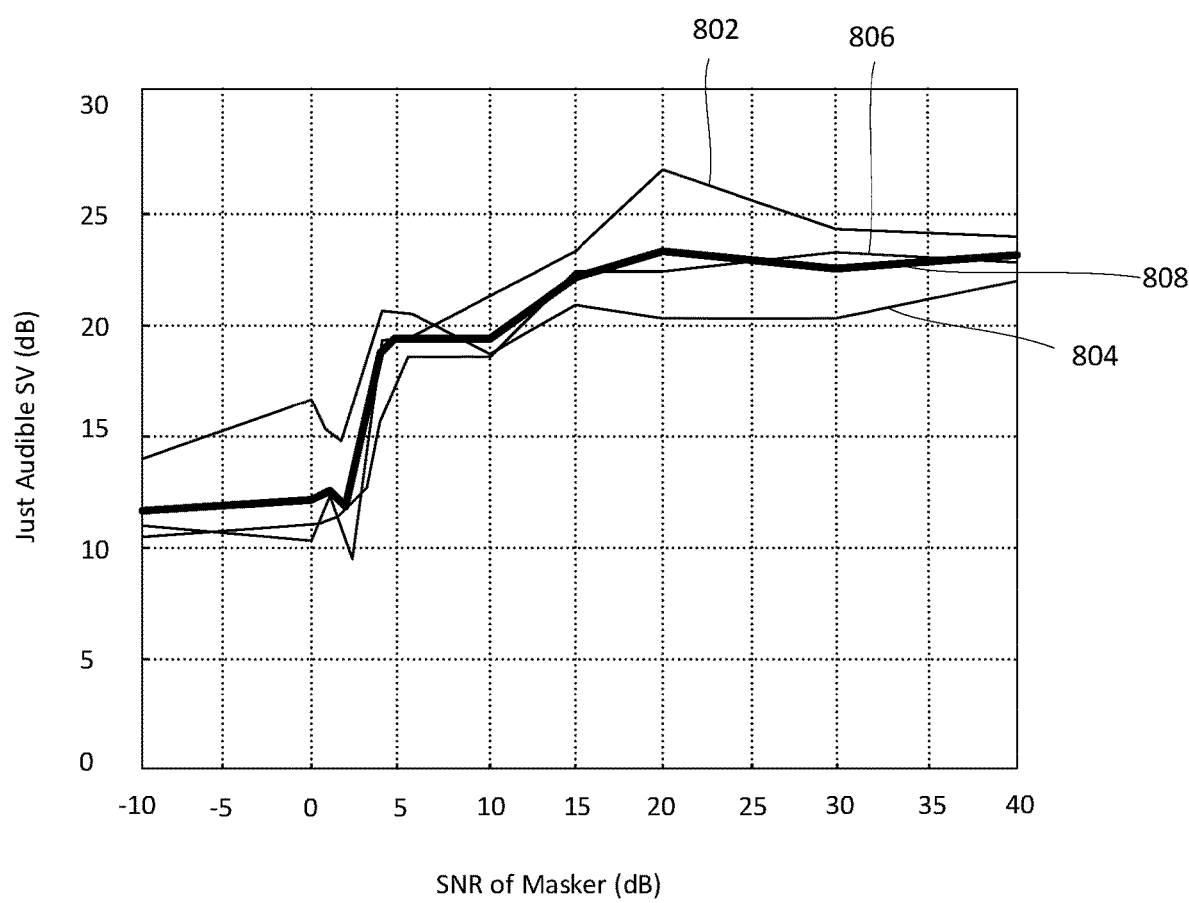
FIG. 10 shows results from an example of measured SV for JND as a function of the tone/noise mix level (SNR)

FIG. 10 shows results from an example of experimentally-measured SV for JND as a function of various tone+narrowband noise mix ratios (SNR). Centre frequencies of 500 Hz 804, 1 kHz 802 and 4 kHz 806 were employed with masker SNRs ranging from −10 dB to 40 dB. Masker was presented to subjects at a level of 80 dB SPL. The average curve 808 (bolded line) represents to SV average across all three centre frequencies.

In an embodiment, another tonality mapping function (different from the tonality mapping rule in ISO/IEC 11172-3:1993) is calibrated at least in part on results of perceptual masking experiments of mixed tone+narrowband noise signals. The objective of this embodiment is to determine the JND level for a masker comprised of a tone+narrowband noise mix and a maskee comprised of uncorrelated narrowband noise at the same frequency. The experiment is repeated at a variety of masker tone/noise mix levels and a variety of frequencies. The result of the experiments may be used for calibrating the tonality mapping as described below.

In one embodiment, first, each of the tone+narrowband noise stimuli are injected into the tonality estimator to capture the associated unpredictability values. From these results, a table is generated that associates each unpredictability value with a required SMR. By combining this table with a tonality-to-SMR rule for tone+narrowband noise masking that matches the SMR range, points are derived on a curve defining the unpredictability to tonality mapping required for calibrating the model. In a final step, a parametric function is derived that approximates the derived calibration curve. The masking experiment and calibration steps may be repeated at a variety of frequencies and input signal levels.

Figure 11:
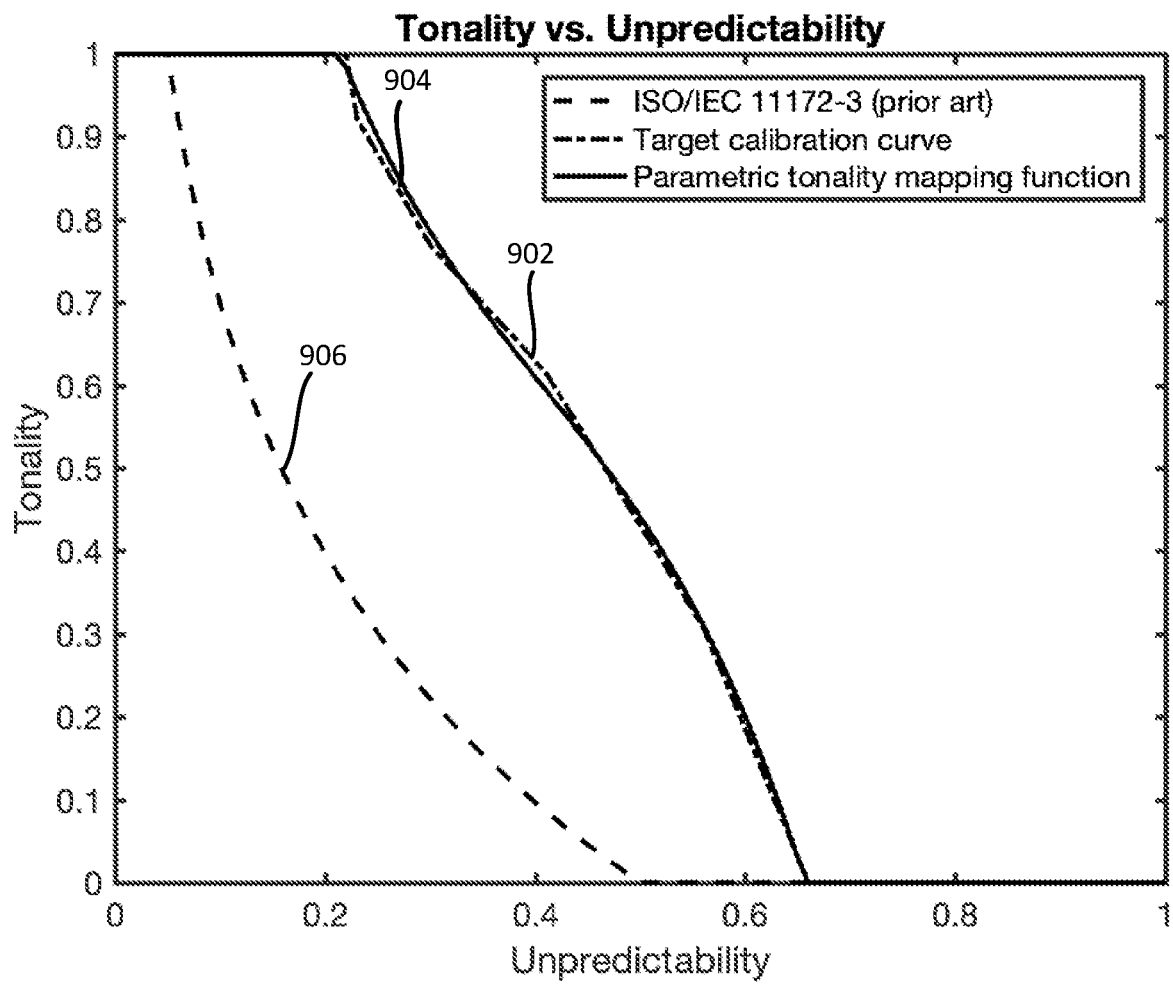
FIG. 11 shows a plot of an estimated tonality vs unpredictability estimates as defined in FIG. 6 in relation to prior art.

FIG. 11 shows by way of example the results of the experiment of one embodiment. It presents a target calibration curve 904 and a parametric model/function 902 (dashed-dotted line) that approximates the derived calibration curve for a 128-pt CMDCT with sine window and 50% overlap. A prior art example is included in the figure for comparison (the dashed line 906) In the example, the LPC analysis is $3^{rd}$ order with a window length of 6. In this embodiment, a parametric function $T(\mu)$ maps unpredictability to tonality according to:

$$T(\mu) = \min(\max(a^*\mu^3 + b^*\mu^2 + c^*\mu + d, 0), 1)$$

Values for the four parameters (a, b, c, d) are derived to approximate the target calibration curve. In the example shown in FIG. 11, the model parameter values for a, b, c, and d are −13.0233, 15.9513, −8.1012, 2.1319.

Although the use of tonality estimation in perceptual models is well-known in the prior art (ISO/IEC 11172-3:1993(E), the dashed line 906 in FIG. 11), prior art models operate in a level-independent manner. In ISO/IEC 11172-3:1993(E), the SMR model adapts based on estimated tonality between 6 and approximately 30 dB for pure noise and tone signals, respectively. The level-dependent model described herein with a calibrated tonality mapping function has been realized in simulation, and is outperforming the prior art model as determined by an objective quality measure and by listening tests.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present disclosure may be appreciated from the following enumerated example embodiments (EEEs):

EEE1. A method for processing an audio signal, the audio signal comprising audio data in a plurality of frequency bands, the method comprising
for each frequency band of the plurality of frequency bands:
determining an energy value for the audio data of the frequency band;
determining a hearing threshold in quiet for the frequency band;
calculating a sensitivity value, SV, for the frequency band using the energy value and the hearing threshold in quiet;
computing a masking threshold for the frequency band using the sensitivity value and the energy value;
determining a bit allocation value of the frequency band using the energy value and the masking threshold value.

EEE2. The method of EEE1, wherein computing the masking threshold comprises applying a spreading function to one of:
the energy values for the frequency bands; or
transformed energy values of the frequency bands;
to determine an excitation value for the frequency band, and combining the sensitivity value with the excitation value.

EEE3. The method of EEE1, wherein computing the masking threshold comprises combining the energy value and the sensitivity value to determine an intermediate threshold value, and applying a spreading function to the intermediate threshold value to determine the masking threshold.

EEE4. The method of any previous EEE, further comprising quantizing audio samples of the audio data of the frequency band in response to the bit allocation value.

EEE5. The method of EEE4, further comprising encoding the quantized audio data of the frequency band into a bitstream.

EEE6. The method of any of EEE1-EEE3, wherein the audio signal is an encoded bitstream comprising an encoded energy value for the frequency band, and wherein determining the energy value for the audio data of the frequency band comprises decoding the encoded energy value from the encoded bitstream.

EEE7. The method of EEE6, further comprising extracting quantized audio samples of the audio data of the frequency band from the encoded bitstream in response to the bit allocation value.

EEE8. The method of EEE7, further comprising dequantizing the quantized audio samples of the audio data of the frequency band and combining the dequantized audio samples of the audio data of each frequency band to generate a decoded audio signal.

EEE9: The method of any preceding EEE, wherein determining the bit allocation value comprises adjusting the masking threshold to achieve a bit allocation that satisfies a target bitrate for the audio signal.

EEE10. The method of EEE9, wherein adjusting the masking threshold comprises: adjusting the masking threshold by adding a constant offset to the masking threshold in the loudness domain until the target bitrate for the audio signal is satisfied.

EEE11. The method of any preceding EEE, wherein the energy value, hearing threshold in quiet and masking threshold are defined in decibels, dB.

EEE12. The method of any preceding EEE, further comprising the step of determining the plurality of frequency bands of the audio signal in accordance with the Equivalent Rectangular Bandwidth, ERB, scale.

EEE13. The method of EEE2 or any preceding EEE being dependent on EEE2, wherein the SV is defined in dB as a subtractive adjustment to the excitation value, wherein the step of determining a bit allocation value comprises assigning more bits for a frequency band having a higher SV compared to said frequency band having a lower SV.

EEE14. The method of any preceding EEE, wherein the step of calculating an SV for the frequency band comprises calculating a first SV using a sensation level, the sensation level being a difference, in the dB scale, between the energy value and the hearing threshold in quiet.

EEE15. The method of EEE14, wherein the step of calculating a first SV comprises multiplying the sensation level with a first scalar.

EEE16. The method of EEE15, wherein the first scalar is frequency dependent.

EEE17. The method of EEE15, wherein the first scalar is constant over all frequency bands.

EEE18. The method of any one of EEE15-EEE17, wherein the step of calculating a first SV comprises adding a second scalar to the sensation level multiplied with the first scalar.

EEE19. The method of any one of EEE14-EEE18, wherein the step of calculating an SV comprises using the first SV as the SV for the frequency band.

EEE20. The method of any of EEE14-EEE18, wherein the step of calculating an SV for the frequency band comprises calculating a second SV using the sensation level, and weighting the first and second SV based on at least one characteristic of the audio signal.

EEE21. The method of EEE20, wherein the step of calculating a second SV for the frequency band comprises multiplying the sensation level with a third scalar different from the first scalar.

EEE22. The method of EEE21, wherein the step of calculating a second SV comprises adding a fourth scalar to the sensation level multiplied with the third scalar, the fourth scalar being different from the second scalar.

EEE23. The method of any one of EEE20-EEE22, wherein the step of weighting the first and second SV based on at least one characteristic of the audio signal comprises calculating a value representing the weight, the value ranging between 0-1, wherein the step of calculating the SV for the frequency band comprises multiplying one of the first and the second SV with the value and multiplying the other one of the first or the second SV with one minus the value, and adding the two resulting sums together to form the SV for the frequency band.

EEE24. The method of any one of EEE20-EEE23, wherein the at least one characteristic defines an estimated tonality of the frequency band of the audio signal.

EEE25. The method of any one of EEE20-EEE23, wherein the at least one characteristic defines an estimated level of noise in the frequency band of the audio signal.

EEE26. The method of EEE24, wherein the estimated tonality is calculated using adaptive prediction of frequency coefficients calculated from the frequency band of the audio signal.

EEE27. The method of EEE26, wherein linear predictive coding, LPC is adaptively applied to MDCT coefficients based on a frequency band of the audio signal from which the MDCT coefficients are calculated.

EEE28. The method of EEE27, wherein a LPC analysis window length is varied as a function of the frequency band.

EEE29. The method of EEE28, wherein a relatively longer LPC analysis window is used for relatively lower frequency bands.

EEE30. The method of any one of EEE27-EEE29, wherein a prediction order of the LPC is varied as a function of the frequency band.

EEE31. The method of any one of the preceding EEE, wherein a frequency range of the audio signal is between 200-7000 Hz.

EEE32. The method of any one of the preceding EEE, wherein the step of determining a hearing threshold in quiet for the frequency band comprises using a predefined table defining the hearing threshold for at least some frequencies.

EEE33. The method of EEE4 or any other EEE being dependent on EEE4, wherein a dynamic range of the audio signal is reduced using a companding algorithm prior to quantizing audio samples of the audio data of the frequency bands.

EEE34. The method of EEE14 or any one of EEE15-EEE33 when being dependent on EEE14, further comprising the step of defining a spreading function for the frequency band depending on the sensation level such that the effect of a spreading function in a frequency band with a relatively higher sensation level is larger compared to an effect of the spreading function in a frequency band with a relatively lower sensation level.

EEE35. A device comprising:
a receiving component configured to receive an audio signal, the audio signal comprising audio data in a plurality of frequency bands;
an analysis component configured to determine a plurality of frequency bands of the audio signal;
the analysis component further being configured to, for each frequency band of the plurality of frequency bands;
determine an energy value for the audio data of the frequency band;
determine a hearing threshold in quiet for the frequency band;
calculate a sensitivity value, SV, for the frequency band using the energy value and the hearing threshold in quiet;
compute a masking threshold for the frequency band using the sensitivity value and the energy value;
determine a bit allocation value of the frequency band using the energy value and the masking threshold value.

EEE36. The device of EEE35, wherein the analysis component is configured to compute the masking threshold by applying a spreading function to one of:
the energy values for the frequency bands; or
transformed energy values of the frequency bands;
to determine an excitation value for the frequency band, and combine the sensitivity value with the excitation value EEE37. The device of EEE35, wherein the analysis component is configured to compute the masking threshold by combining the energy value and the sensitivity value to determine an intermediate threshold value, and applying a spreading function to the intermediate threshold value to determine the masking threshold.

EEE38. The device of any one of EEE35-EEE37 being an encoder, further comprising an encoding component configured to quantize audio samples of the audio data of the frequency band in response to the bit allocation value.

EEE39. The device of EEE38, wherein the encoding component is further configured to encode the quantized audio data of the frequency band into a bitstream.

EEE40. The device of any one of EEE35-EEE37 being a decoder, wherein the audio signal is an encoded bitstream comprising an encoded energy value for the frequency band, the device further comprising a decoding component configured to decode the encoded energy value from the encoded bitstream, wherein the analysis component uses the decoded energy value when determining the energy value.

EEE41. The device of EEE40, wherein the decoding component is configured to extract quantized audio samples of the audio data of the frequency band from the encoded bitstream in response to the bit allocation value.

EEE42. The device of EEE41, wherein the decoding component is further configured to dequantize the quantized audio samples of the audio data of the frequency band and combine the dequantized audio samples of the audio data of each frequency band to generate a decoded audio signal.

EEE43. The device of any one of EEE35-EEE42, wherein the analysis component is configured to: when determining the bit allocation value, adjust the masking threshold to achieve a bit allocation that satisfies a target bitrate for the audio signal.

EEE44. The device of EEE43, wherein the analysis component is configured to: when adjusting the masking threshold, adjust the masking threshold by adding a constant offset to the masking threshold in the loudness domain until the target bitrate for the audio signal is satisfied.

EEE45. The device of any one of EEE35-EEE44, wherein the analysis component is configured to define the energy value, hearing threshold in quiet and masking threshold in decibels, dB.

EEE46. The device of any one of EEE35-EEE45, wherein the analysis component is configured to determine the plurality of frequency bands of the audio signal in accordance with the Equivalent Rectangular Bandwidth, ERB, scale.

EEE47. The device of EEE36 or any one of EEE37-EEE46 when being dependent on EEE36, wherein the SV is defined in dB as a subtractive adjustment to the excitation value, wherein the analysis component is configured determine a bit allocation value by assigning more bits for a frequency band having a higher SV compared to said frequency band having a lower S V.

EEE48. The device of any one of EEE35-EEE47, wherein the analysis component is configured to calculate an SV for the frequency band by calculating a first SV using a sensation level, the sensation level being a difference, in the dB scale, between the energy value and the hearing threshold in quiet.

EEE49. The device of EEE48, wherein the analysis component is configured to calculate the first SV by multiplying the sensation level with a first scalar.

EEE50. The device of EEE49, wherein the first scalar is frequency dependent.

EEE51. The device of EEE49, wherein the first scalar is constant over all frequency bands.

EEE52. The device of EEE49-EEE51, wherein the analysis component is configured to calculate the first SV by adding a second scalar to the sensation level multiplied with the first scalar.

EEE53. The device of any one of EEE48-EEE52, wherein the analysis component is configured to calculate the SV by using the first SV as the SV for the frequency band.

EEE54. The device of any one of EEE48-EEE52, wherein the analysis component is configured to calculate the SV for the frequency band by further calculating a second SV using the sensation level, and weighting the first and second SV based on at least one characteristic of the audio signal.

EEE55. The device of EEE54, wherein the analysis component is configured to calculate the second SV for the frequency band by multiplying the sensation level with a third scalar different from the first scalar.

EEE56. The device of EEE55, wherein the analysis component is configured to calculate the second SV by adding a fourth scalar to the sensation level multiplied with the third scalar, the fourth scalar being different from the second scalar.

EEE57. The device of any one of EEE54-EEE55, wherein the analysis component is configured to perform the weighting the first and second SV based on at least one characteristic of the audio signal by calculating a value representing the weight, the value ranging between 0-1, and calculating the SV for the frequency band by multiplying one of the first and the second SV with the value and multiplying the other one of the first or the second SV with one minus the value, and adding the two resulting sums together to form the SV for the frequency band.

EEE58. The device of any one of EEE54-EEE57, wherein the at least one characteristic defines an estimated tonality of the frequency band of the audio signal.

EEE59. The device of any one of EEE54-EEE57, wherein the at least one characteristic defines an estimated level of noise in the frequency band of the audio signal.

EEE60. The device of EEE58, wherein the analysis component is configured to calculate the estimated tonality using adaptive prediction of frequency coefficients calculated from the frequency band of the audio signal.

EEE61. The device of EEE60, wherein the analysis component is configured to adaptively apply LPC to MDCT coefficients based on a frequency band of the audio signal from which the MDCT coefficients are calculated.

EEE62. The device of EEE61, wherein an LPC analysis window length is varied as a function of the frequency band.

EEE63. The device of EEE62, wherein a relatively longer LPC analysis window is used for relatively lower frequency bands.

EEE64. The device of any one of EEE62-EEE63, wherein a prediction order of the LPC is varied as a function of the frequency band.

EEE65. The device of any one of EEE35-EEE64, wherein a frequency range of the audio signal is between 200-7000 Hz.

EEE66. The device of any one of EEE35-EEE65, further comprising a memory, the memory storing a table defining the hearing threshold in quiet for at least some frequencies, wherein the analysis component is configured to determine the hearing threshold in quiet for the frequency band by using the predefined table.

EEE67. The device of EEE38 or any other EEE being dependent on EEE38, further comprising a companding component configured to reduce a dynamic range of the audio signal using a companding algorithm prior to quantizing audio samples of the audio data of the frequency bands.

EEE68. The device of EEE48 or any one of EEE49-EEE67 when being dependent on EEE48, wherein the analysis component is configured to define a spreading function for the frequency band depending on the sensation level such that the effect of spreading function in a frequency band with a relatively higher sensation level is larger compared to an effect of spreading function in a frequency band with a relatively lower sensation level.

EEE69. The device of any one of EEE35-EEE67, implemented in a real time two-way communication device.

EEE70. A method for estimating a tonality of an input signal, comprising the steps of:
applying a filterbank to achieve a set of frequency coefficients;
calculate the estimated tonality using adaptive prediction of the frequency coefficients.

EEE71. The method of EEE70, wherein the step of calculating an estimated tonality comprises applying adaptive linear prediction to the frequency coefficients based on a frequency band of the audio signal from which the frequency coefficients are calculated.

EEE72. The method of EEE70, wherein an LPC analysis window length is varied as a function of the frequency band.

EEE73. The method of EEE72, wherein a relatively longer LPC analysis window is used for relatively lower frequency bands.

EEE74. The method of any one of EEE72-EEE73, wherein a prediction order of the LPC is varied as a function of the frequency band.

EEE75. The method of any one of EEE70-EEE74, wherein the filterbank comprises one of: a 128-band complex MDCT or DFT filterbank, and a 64-band complex QMF filterbank.

EEE76. The method of any one of EEE71-EEE73, wherein the LPC analysis window is an asymmetric Hamming window.

EEE77. The method of any one of EEE70-EEE76, comprising the step of:

weighting predictability measures from the adaptive prediction according to a relative perceptual importance of each predictability measure.

EEE78. The method of EEE77, wherein the step of weighting the predictability measures contained within each time-frequency tile comprises one of: weighting based on the energy or loudness of the input signal.

EEE79. The method of any one of EEE70-EEE78, further comprising the step of: combining predictability measures from the adaptive prediction of the frequency coefficients to match time and frequency resolution of the filterbank.

EEE80. The method of EEE2, or any one of EEE4-EEE34 when dependent on EEE2, wherein the sensitivity value and the excitation value are defined in decibels, dB, and the step of combining comprises subtracting the sensitivity value from the excitation value, or wherein the sensitivity value and the excitation value are defined on an intensity scale and the step of combining comprises computing a quotient of the excitation value and the sensitivity value.

EEE81. The method of EEE3, or any one of EEE4-EEE34 when dependent on EEE3, wherein the energy value and the sensitivity value are defined in decibels, dB, and the step of combining comprises subtracting the sensitivity value from the energy value, or wherein the energy value and the sensitivity value are defined on an intensity scale and the step of combining comprises computing a quotient of the energy value and the sensitivity value.

EEE82. The method of any one of EEE1-EEE34 or EEE80-EEE81, wherein calculating the sensitivity value comprises calculating a ratio or a difference between the energy value of the frequency band and the hearing threshold in quiet for the frequency band.

EEE83. A computer program product comprising a computer-readable storage medium with instructions adapted to carry out the method of any one of EEE 1-34 or EEE80-82 when executed by a device having processing capability.

EEE84. A computer program product comprising a computer-readable storage medium with instructions adapted to carry out the method of any one of EEE 70-79 when executed by a device having processing capability.

EEE85. The device of EEE36, or any one of EEE38-EEE69 when dependent on EEE36, wherein the sensitivity value and the excitation value are defined in decibels, dB, and the step of combining comprises subtracting the sensitivity value from the excitation value, or wherein the sensitivity value and the excitation value are defined on an intensity scale and the step of combining comprises computing a quotient of the excitation value and the sensitivity value.

EEE86. The device of EEE37, or any one of EEE38-EEE69 when dependent on EEE37, wherein the energy value and the sensitivity value are defined in decibels, dB, and the step of combining comprises subtracting the sensitivity value from the energy value, or wherein the energy value and the sensitivity value are defined on an intensity scale and the step of combining comprises computing a quotient of the energy value and the sensitivity value.

The invention claimed is:

1. A method for processing an audio signal, the audio signal comprising audio data in a plurality of frequency bands, the method comprising for each frequency band of the plurality of frequency bands:
determining an energy value for the audio data of the frequency band;
determining a hearing threshold in quiet for the frequency band;
calculating a sensitivity value, SV, for the frequency band using the energy value and the hearing threshold in quiet, wherein calculating the sensitivity value comprises calculating a ratio or a difference between the energy value of the frequency band and the hearing threshold in quiet for the frequency band;
computing a masking threshold for the frequency band using the sensitivity value and the energy value, wherein computing the masking threshold comprises applying a spreading function to one of: the energy values for the frequency bands; or transformed energy values of the frequency bands; to determine an excitation value for the frequency band, and combining the sensitivity value with the excitation value;
determining a bit allocation value of the frequency band using the energy value and the masking threshold.

2. The method of claim 1, wherein, if the hearing threshold in quiet is greater than the computed masking threshold, the computed masking threshold is replaced with the hearing threshold in quiet.

3. The method of claim 1, wherein the SV is defined in dB as a subtractive adjustment to the excitation value, wherein the step of determining a bit allocation value comprises assigning more bits for a frequency band having a higher SV compared to said frequency band having a lower SV.

4. The method of claim 1, wherein the step of calculating an SV for the frequency band comprises calculating a first SV using a sensation level, the sensation level being a difference, in the dB scale, between the energy value and the hearing threshold in quiet.

5. The method of claim 4, wherein the step of calculating a first SV comprises multiplying the sensation level with a first scalar, and/or wherein the step of calculating an SV comprises using the first SV as the SV for the frequency band.

6. The method of claim 4, wherein the step of calculating an SV for the frequency band comprises calculating a second SV using the sensation level and weighting the first and second SV based on at least one characteristic of the audio signal, and wherein the step of computing the masking threshold for the frequency band using the sensitivity value and the energy value includes computing the masking threshold for the frequency band using the weighted sensitivity value and the energy value, and wherein the step of combining the sensitivity value with the excitation value includes combining the weighted sensitivity value with the excitation value.

7. The method of claim 6, wherein the at least one characteristic defines an estimated level of tonality in the frequency band of the audio signal.

8. The method of claim 7, wherein the estimated tonality is calculated using adaptive prediction of frequency coefficients calculated from the frequency band of the audio signal.

9. The method of claim 8, wherein linear predictive coding, LPC is adaptively applied to MDCT coefficients based on a frequency band of the audio signal from which the MDCT coefficients are calculated.

10. The method of claim 9, wherein a LPC analysis window length is varied as a function of the frequency band, and/or wherein a prediction order of the LPC is varied as a function of the frequency band.

11. The method of claim 4, wherein the spreading function for the frequency band depends on the sensation level such that the effect of a spreading function in a frequency band with a relatively higher sensation level is larger compared to an effect of the spreading function in a frequency band with a relatively lower sensation level.

12. The method of claim 1, further comprising quantizing audio samples of the audio data of the frequency band in response to the bit allocation value and encoding the quantized audio data of the frequency band into a bitstream.

13. The method of claim 12, wherein a dynamic range of the audio signal is reduced using a companding algorithm prior to quantizing audio samples of the audio data of the frequency bands.

14. A non-transitory computer-readable storage medium comprising a sequence of instructions, wherein the instructions, when executed by a processing device, cause the processing device to perform the method of claim 1.

15. A method for processing an audio signal, the audio signal comprising audio data in a plurality of frequency bands, the method comprising
for each frequency band of the plurality of frequency bands:
determining an energy value for the audio data of the frequency band;
determining a hearing threshold in quiet for the frequency band;
calculating a sensitivity value, SV, for the frequency band using the energy value and the hearing threshold in quiet, wherein calculating the sensitivity value comprises calculating a ratio or a difference between the energy value of the frequency band and the hearing threshold in quiet for the frequency band;
computing a masking threshold for the frequency band using the sensitivity value and the energy value, wherein computing the masking threshold comprises combining the energy value and the sensitivity value to determine an intermediate threshold value, and applying a spreading function to the intermediate threshold value to determine the masking threshold;
determining a bit allocation value of the frequency band using the energy value and the masking threshold.

16. The method of claim 15, wherein the audio signal is an encoded bitstream comprising an encoded energy value for the frequency band, and wherein determining the energy value for the audio data of the frequency band comprises decoding the encoded energy value from the encoded bitstream.

17. The method of claim 16, further comprising extracting quantized audio samples of the audio data of the frequency band from the encoded bitstream in response to the bit allocation value, dequantizing the quantized audio samples of the audio data of the frequency band, and combining the dequantized audio samples of the audio data of each frequency band to generate a decoded audio signal.

18. A non-transitory computer-readable storage medium comprising a sequence of instructions, wherein the instructions, when executed by a processing device, cause the processing device to perform the method of claim 15.

19. A device comprising:
a receiving component configured to receive an audio signal, the audio signal comprising audio data in a plurality of frequency bands;
an analysis component configured to determine a plurality of frequency bands of the audio signal;
the analysis component further being configured to, for each frequency band of the plurality of frequency bands;
determine an energy value for the audio data of the frequency band;
determine a hearing threshold in quiet for the frequency band;
calculate a sensitivity value, SV, for the frequency band using the energy value and the hearing threshold in quiet, wherein calculating the sensitivity value comprises calculating a ratio or a difference between the energy value of the frequency band and the hearing threshold in quiet for the frequency band;
compute a masking threshold for the frequency band using the sensitivity value and the energy value, wherein computing the masking threshold comprises applying a spreading function to one of: the energy values for the frequency bands; or transformed energy values of the frequency bands; to determine an excitation value for the frequency band, and combining the sensitivity value with the excitation value;
determine a bit allocation value of the frequency band using the energy value and the masking threshold.

20. A device comprising:
a receiving component configured to receive an audio signal, the audio signal comprising audio data in a plurality of frequency bands;
an analysis component configured to determine a plurality of frequency bands of the audio signal;
the analysis component further being configured to, for each frequency band of the plurality of frequency bands;
determine an energy value for the audio data of the frequency band;
determine a hearing threshold in quiet for the frequency band;
calculate a sensitivity value, SV, for the frequency band using the energy value and the hearing threshold in quiet, wherein calculating the sensitivity value comprises calculating a ratio or a difference between the energy value of the frequency band and the hearing threshold in quiet for the frequency band;
compute a masking threshold for the frequency band using the sensitivity value and the energy value, wherein computing the masking threshold comprises combining the energy value and the sensitivity value to determine an intermediate threshold value, and applying a spreading function to the intermediate threshold value to determine the masking threshold;

determine a bit allocation value of the frequency band using the energy value and the masking threshold.

* * * * *